United States Patent
Nagahori

(10) Patent No.: US 7,952,427 B2
(45) Date of Patent: May 31, 2011

(54) SIGNAL AMPLIFIER CIRCUIT AND OPTICAL RECEIVER

(75) Inventor: Takeshi Nagahori, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 437 days.

(21) Appl. No.: 11/688,724

(22) Filed: Mar. 20, 2007

(65) Prior Publication Data
US 2007/0226771 A1 Sep. 27, 2007

(30) Foreign Application Priority Data
Mar. 22, 2006 (JP) .................................. 2006-079422

(51) Int. Cl.
*H03F 3/68* (2006.01)
(52) U.S. Cl. ....... 330/69; 330/110; 330/308; 250/214 A; 250/214 AG; 327/309
(58) Field of Classification Search .................. 330/308, 330/110, 69; 250/214 A, 214 AG; 327/309
See application file for complete search history.

(56) References Cited

U.S. PATENT DOCUMENTS

| | | | |
|---|---|---|---|
| 5,612,810 A | 3/1997 | Inami et al. | |
| 5,892,609 A | 4/1999 | Saruwatari | |
| 6,115,163 A | 9/2000 | Nobuhara | |
| 6,587,004 B2 | 7/2003 | Ide | |
| 6,819,722 B2 | 11/2004 | Hatakeyama | |
| 6,965,257 B2 | 11/2005 | Tanaka | |

FOREIGN PATENT DOCUMENTS

| | | | |
|---|---|---|---|
| JP | 8084160 A | 3/1996 | |
| JP | 2656734 B2 | 5/1997 | |
| JP | 10084231 A | 3/1998 | |
| JP | 11-112439 A | 4/1999 | |
| JP | 2004072710 A | 3/2004 | |
| JP | 3606143 B2 | 10/2004 | |
| WO | WO 01/48914 A1 | 7/2001 | |

*Primary Examiner* — Michael B Shingleton
(74) *Attorney, Agent, or Firm* — Sughrue Mion, PLLC

(57) ABSTRACT

A signal amplifier circuit includes peak value holding circuit 11 receiving positive-phase input signal, peak value holding circuit 12 receiving negative-phase input signal, adder 13 adding the positive-phase input signal and output signal of peak value holding circuit 12, adder 14 adding the negative-phase input signal and output signal of the peak value holding circuit 11, non-inverting amplifier 15 amplifying output signal of adder 13, non-inverting amplifier 16 amplifying output signal of adder 14, peak value holding circuit 21 receiving positive-phase output signal of non-inverting amplifier 15, peak value holding circuit 22 receiving negative-phase output signal of non-inverting amplifier 16, adder 23 adding the positive-phase output signal and output signal of peak value holding circuit 22, adder 24 adding the negative-phase output signal and output signal of peak value holding circuit 21, and differential amplifier 29 amplifying difference between output signals of adders 23 and 24. Error in discrimination for small-amplitude signal embedded in tail is reduced.

25 Claims, 25 Drawing Sheets

FIG. 3
(a)
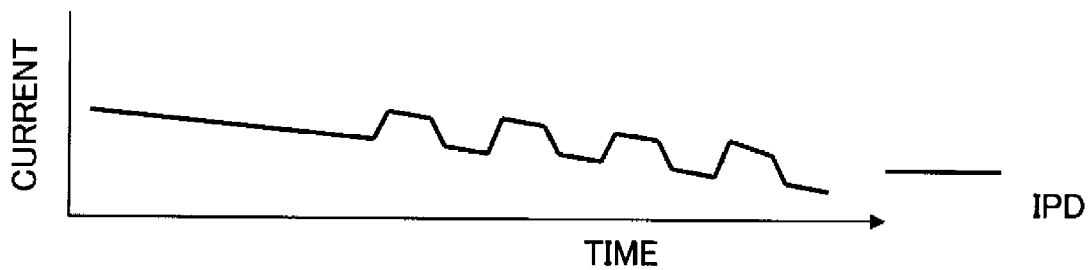
(b)
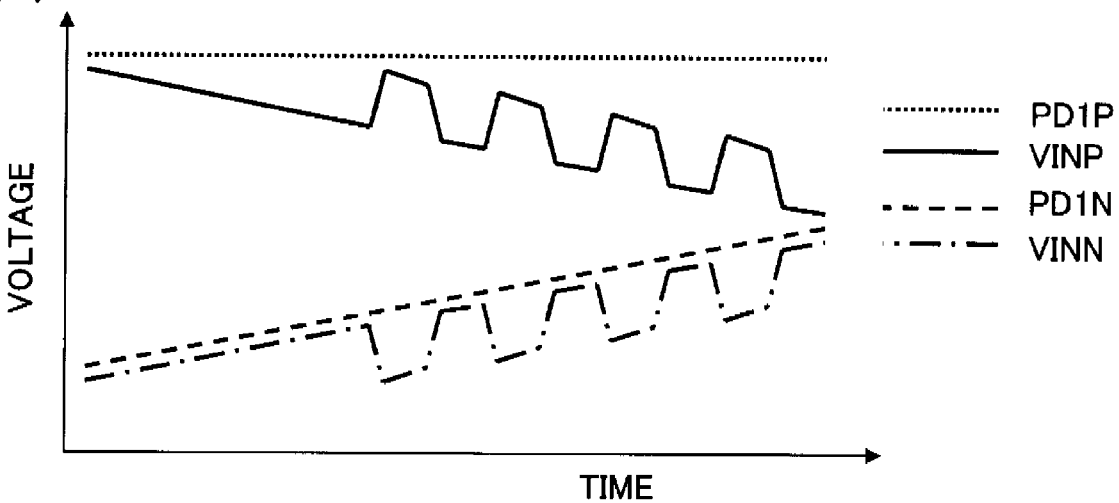
(c)
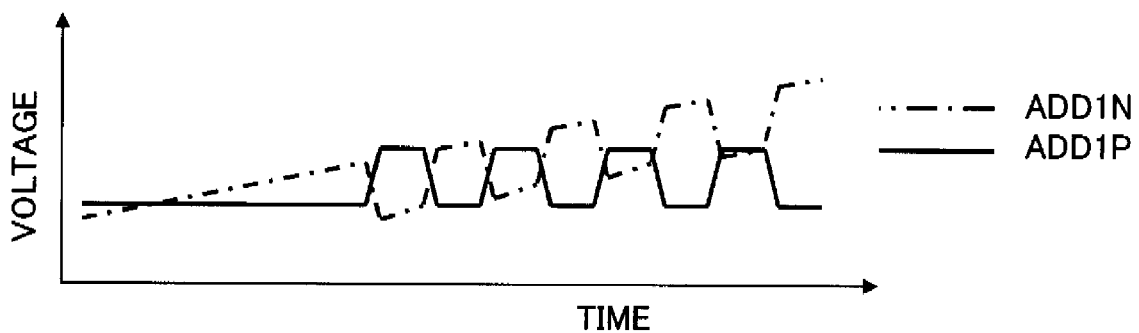

FIG. 12
(a)
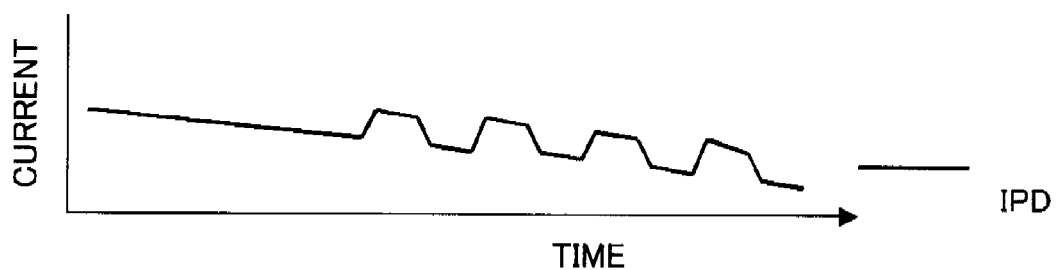
(b)
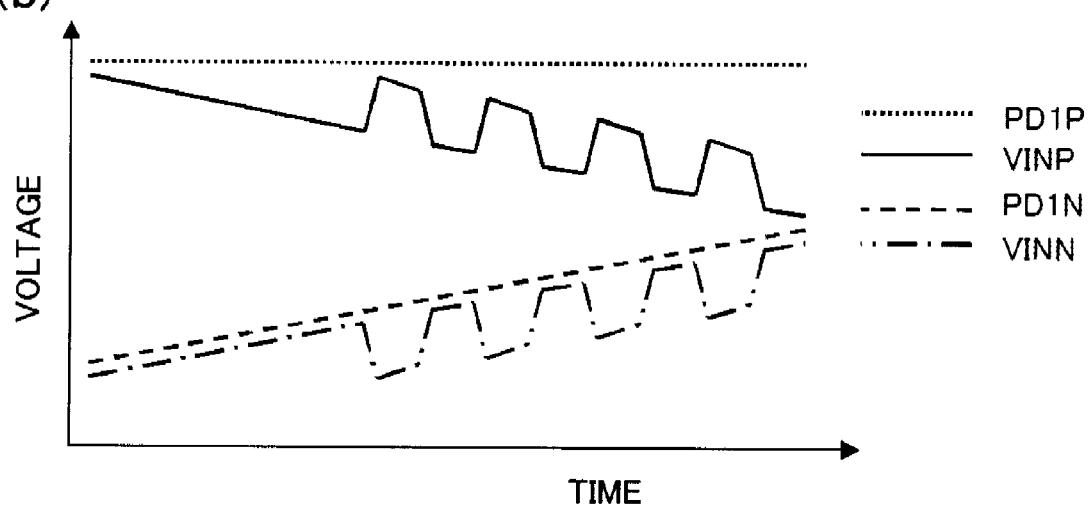
(c)
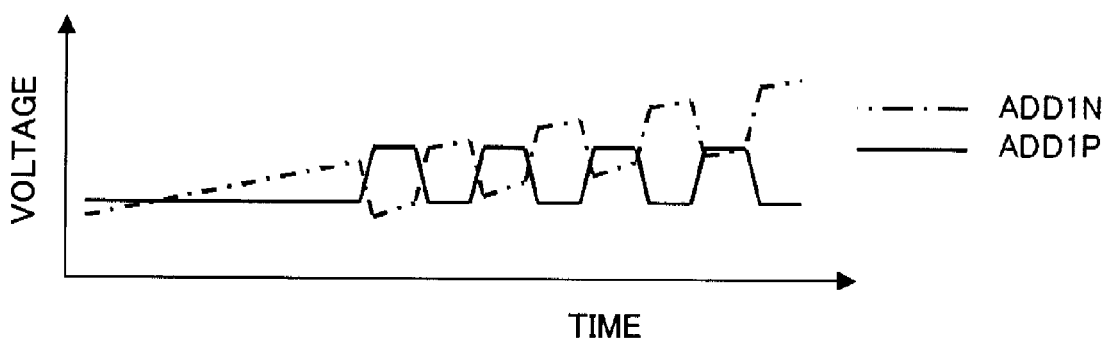

SIGNAL AMPLIFIER CIRCUIT AND OPTICAL RECEIVER

FIELD OF THE INVENTION

The present invention relates to a signal amplifier circuit and an optical receiver. More specifically, the invention relates to a signal amplifier circuit that amplifies a baseband digital signal in burst form and an optical receiver that uses the signal amplifier circuit.

BACKGROUND OF THE INVENTION

An optical receiver used in a PON (passive optical network) system or the like receives optical signals in burst form sent from a plurality of subscriber terminals with distances from the respective subscriber terminals being different. In this case, amplitudes of the received baseband digital signals in burst form greatly change over time, and an amplitude ratio between a large-amplitude burst signal and a small-amplitude burst signal may reach even 1000 to 1. On the other hand, with respect to an input current signal of a receiver circuit in the optical receiver of this type, an offset current of a given level is generated due to an influence caused by a poor extinction ratio of an optical signal output by a transmitter, reflected return light, a dark current generated in a light receiving element of the receiver, and the like. At the same time, among carriers generated within the light receiving element in response to incidence of light, a carrier generated in a location within the light receiving element with low field intensity spreads slowly and gradually. Thus, an offset current that changes with a time constant larger than a clock period of the signal is generated.

The offset current which changes with the large time constant as described above has a frequency characteristic as shown at (a) of FIG. 22. That is, the light receiving element exhibits a high-frequency attenuation characteristic that has a shoulder at a frequency of several kHz to several hundred kHz. When optical waveforms of a large-amplitude burst signal (packet A) and a small-amplitude burst signal (packet B) that follows the large-amplitude burst signal as shown at (b) of FIG. 22 are input to the light receiving element having such a characteristic, a "0" level of an output signal of the light receiving element rises due to a low frequency response to the packet A, as shown at (c) of FIG. 22. Then, at a leading edge portion of the packet B that follows the packet A, the level is raised, and then gradually falls to the original "0" level. Such a phenomenon is herein referred to as a "tail".

In the optical receiver used in the PON system or the like, in which the offset current as described above is present, it is important to receive the small-amplitude burst signal to be superimposed on the tail that appears immediately after the large-amplitude burst signal, with no errors. The burst signal is a unipolar signal. Thus, just by performing discrimination between the burst signals using a given threshold value, the leading edge portion of the small-amplitude burst signal immediately after the large-amplitude burst signal may be embedded in the tail, so that the leading edge portion of the small-amplitude burst signal will not be able to be received. Alternatively, when the threshold value is set so that the leading edge portion of the small-amplitude burst can be received, an end portion of the small-amplitude burst will not be able to be received. That is, when a current signal having such as offset is amplified, a duty ratio of an output waveform may remarkably fluctuate. Thus, accurate discrimination of a logic "0" level or a logic "1" level may become difficult.

Among duty ratio fluctuations caused by these offset currents, in regard to a duty ratio fluctuation caused by the offset current of the given level, various types of conventional techniques which suppress the duty ratio fluctuation caused by the offset current of the given level have been proposed. Patent Document 1, for example, describes an optical receiver circuit in which an electrical signal received from a light receiving element is converted to positive-phase and negative-phase output signals by a pre-amplifier, peaks of the signals are held, and added through a feedforward connection. In this optical receiver circuit, degradation in the duty ratio of an output waveform due to an input signal and an offset of the pre-amplifier is not generated. Thus, even when a received signal level is small, a margin for data discrimination is not degraded.

However, in the optical receiver circuit described in Patent Document 1, the offset that transitionally varies according to an elapsed time cannot be suppressed. The duty ratio of the output waveform will therefore remarkably vary. An influence of the offset that transitionally varies according to an elapsed time on the duty ratio variation of the output waveform appears noticeably especially when a large reception dynamic range as in the PON system is required.

Then, Patent Document 2 discloses an offset control circuit and an optical receiver that uses the offset control circuit, which can eliminate the offset that transitionally varies according to an elapsed time. With the offset control circuit and the optical receiver that uses the offset control circuit, even when such a large reception dynamic range is required, or even when optical signals in burst form, of which level differences are greatly different, are received, an output waveform free of fluctuations in duty ratio can be obtained.

FIG. 23 is a block diagram showing a configuration of the optical receiver described in Patent Document 2. This optical receiver is constituted from an optical receiving element 100 that converts an optical signal to a current signal IPD, a pre-amplifier circuit 120 that converts the current signal IPD output by the light receiving element 100 to a voltage signal, and amplifies the voltage signal, thereby outputting a positive-phase input signal VINP and a negative-phase input signal VINN, which are differential voltage signals, an offset control circuit 130 that cancels an offset that transitionally changes according to an elapsed time, and a discrimination level control circuit 140 that eliminates an offset of a certain level that does not change temporally and also sets a threshold value for performing discrimination between the logic "0" and "1" levels.

The offset control circuit 130 includes peak value hold circuits 132 and 131 that hold peak values of the positive-phase input signal VINP and the negative-phase input signal VINN output by the pre-amplifier circuit 120, respectively, doubling circuits 135 and 136 that double an output signal PDIN of the peak value hold circuit 131 and an output signal PDIP of the peak value hold circuit 132, respectively, an adder circuit 137 that adds an output signal of the doubling circuit 135 and the positive-phase input signal VINP, an adder circuit 138 that adds an output signal of the doubling circuit 136 and the negative-phase input signal VINN, and a differential amplifier circuit 139 that amplifies outputs of the adder circuits 137 and 138.

The discrimination level control circuit 140 is the circuit disclosed in Patent Document 1 or the like. The discrimination level control circuit 140 includes peak value hold circuits 142 and 141 that hold peak values of a positive-phase signal VO1P and a negative-phase signal VO1N output by the differential amplifier circuit 139, respectively, an adder circuit 143 that adds an output signal PDD2N of the peak value hold circuit 141 and the positive-phase signal VO1P, an adder circuit 144 that adds an output signal PDD2P of the peak value hold circuit 142 and the negative-phase signal VO1N, and a differential amplifier circuit 145 that amplifies an output signal AD2P of the adder circuit 143 and an output signal AD2N of the adder circuit 144. By comparing values of the output signals VO2P and VO2N of the differential amplifier circuit 145, a binary (values of "1" and "0") digital signal COMPOUT is obtained.

Next, waveforms of respective portions of the optical receiver configured as described above will be described. FIGS. 24 and 25 are diagrams showing the waveforms of the respective portions of the optical receiver in FIG. 23. Referring to FIG. 24, the positive-phase input signal VINP and the negative-phase input signal VINN are shown. The current signal IPD with a tail is emitted from the light receiving element 100, and passed through the pre-amplifier circuit 120, thereby generating a differential voltage signal pair of the positive-phase input signal VINP and the negative-phase input signal VINN. Due to application of the tail, an envelope of the positive-phase input signal VINP monotonously decreases, while an envelope of the negative-phase input signal VINN monotonously increases. Accordingly, the output signal PD1N that indicates the peak value held in the peak value hold circuit 131 follows the tail, thereby following a signal amplitude peak value. On contrast therewith, the output signal PD1P that indicates the peak value held in the peak value hold circuit 132 does not reflect a signal amplitude peak value. The output signal AD1P is obtained by the addition by the adder 137 to the output signal PD1N through the doubling circuit 135. The output signal AD1N is obtained by the addition by the adder 138 to the output signal PD1P through the doubling circuit 136.

Further, as shown in FIG. 25, a difference voltage between the output signals VO1P and VO1N obtained by amplifying a difference voltage between the output signals AD1P and AD1N by the differential amplifier 139 becomes a unipolar signal without the tail but with the offset. By inputting the output signals VO1P and VO1N to the discrimination level control circuit 140, which is a unipolar to bipolar signal converter circuit, the output signals VO2P and VO2N of bipolar signals can be obtained as outputs of the discrimination level conversion circuit 140. By comparing these signals by a comparator, the binary digital signal COMPOUT that has a satisfactory duty ratio even when the light receiving element 100 emits a current with a tail can be obtained.

Patent Document 3 discloses a signal amplifying circuit that handles various transient responses that may occur at a leading edge of a burst cell and is also resistant to disturbances such as extraneous noise. This signal amplifier circuit includes a first level detection circuit that detects a direct current level of a positive-phase signal, a first adder circuit that adds a negative-phase signal to a detection output of the first level detection circuit, a second level detection circuit that detects a direct current level of the negative-phase signal, a second adder circuit that adds the positive-phase signal to a detection output of the second level detection circuit, and a differential amplifier circuit that differentially amplifies outputs of the first and second adder circuits. Then, each of the first and second level detection circuits includes a peak detection circuit that detects a maximum value of the positive-phase signal, a bottom detection circuit that detects a relative minimum value of the positive-phase signal based on a detection level of the peak detection circuit, and a voltage divider circuit that performs voltage division of detection outputs of the peak detection circuit and the bottom detection circuit.

Further, Patent Document 4 discloses as a related device an optical burst receiving apparatus that allows maintenance of a high transmission efficiency without causing reception inability resulting from a frequency response or deterioration of a code error rate.

[Patent Document 1] JP Patent No. 2656734
[Patent Document 2] JP Patent No. 3606143
[Patent Document 3] International Publication W001/048914A1
[Patent Document 4] JP Patent Kokai Publication No. JP-A-11-112439

SUMMARY OF THE DISCLOSURE

The following analyses are given by the present invention. The disclosures of the aforementioned documents are herein incorporated by reference thereto, which may be upon needs referred to as part of the disclosure of the present invention.

In a circuit in Patent Document 2, a difference signal between the output signal AD1P of the adder 137 and the output signal AD1N of the adder 138 within the offset control circuit 130 shown in FIG. 23 is not a bipolar signal. For this reason, when a gain of the differential amplifier 139 is increased, and when the differential amplifier 139 operates as a limiter amplifier because the input signals VINP and VINN are large, duty ratios of the output signals of the offset control circuit 130 may greatly deviate from one to one.

Assume that the gain of the differential amplifier 139 is set to be small so that the differential amplifier 139 does not operate as the limiter amplifier when the input signals VINP and VINN are large. In this case, amplitudes of the input signals VO1P and VO1N for the identification level control circuit 140 will decrease. When the input signals are small, the signals will be greatly affected by a holding error between the peak value hold circuits 141 and 142 and an input offset of the differential amplifier 139. Accordingly, highly accurate unipolar to bipolar signal conversion may not be performed. An error in discrimination for the binary digital signal by the comparator may occur.

On the other hand, in the signal amplifying circuit disclosed in Patent Document 3, the peak detection circuit and the bottom detection circuit are provided for each of the positive-phase signal and the negative-phase signal to cancel direct current components of the positive-phase and negative-phase signals, respectively. Thus, inputs to the limiter amplifier become bipolar signals. However, the peak detection circuit and the bottom detection circuit need to be provided for each of the positive-phase input signal and the negative-phase input signal. For this reason, the circuit may become complex, and adjustment or the like may be required in order to keep held values to be accurate.

As described above, in the conventional circuits, it is difficult to obtain a large input dynamic range with a simple circuit, and an error in a small-amplitude burst signal embedded in a tail immediately after a large-amplitude burst signal cannot be reduced sufficiently.

According to a first aspect of the present invention, there is provided a signal amplifier circuit comprising: a first level holding circuit that receives a positive-phase input signal; a second level holding circuit that receives a negative-phase input signal; a first adder that adds the positive-phase input signal and an output signal of the second level holding circuit; a second adder that adds the negative-phase input signal and an output signal of the first level holding circuit; a first amplifier that amplifies an output signal of the first adder; and a second amplifier that amplifies an output signal of the second adder.

Further aspects of the present invention will be disclosed hereinafter. Note that the term "negative-phase" denotes an inversed phase of the positive-phase.

The meritorious effects of the present invention are summarized as follows.

According to the present invention, a wide input dynamic range can be obtained with a simple circuit, and a discrimination error of a small-amplitude signal embedded in a tail immediately after a large-amplitude burst signal can be reduced.

BRIEF DESCRIPTION OF THE DRAWINGS

FIG. 3 is a first diagram showing signal waveforms of respective portions of the signal amplifier circuit according to the first example of the present invention;

FIG. 12 is a first diagram showing signal waveforms of respective portions of the signal amplifier circuit according to the fifth example of the present invention;

PREFERRED MODES OF THE DISCLOSURE

Figure 1:
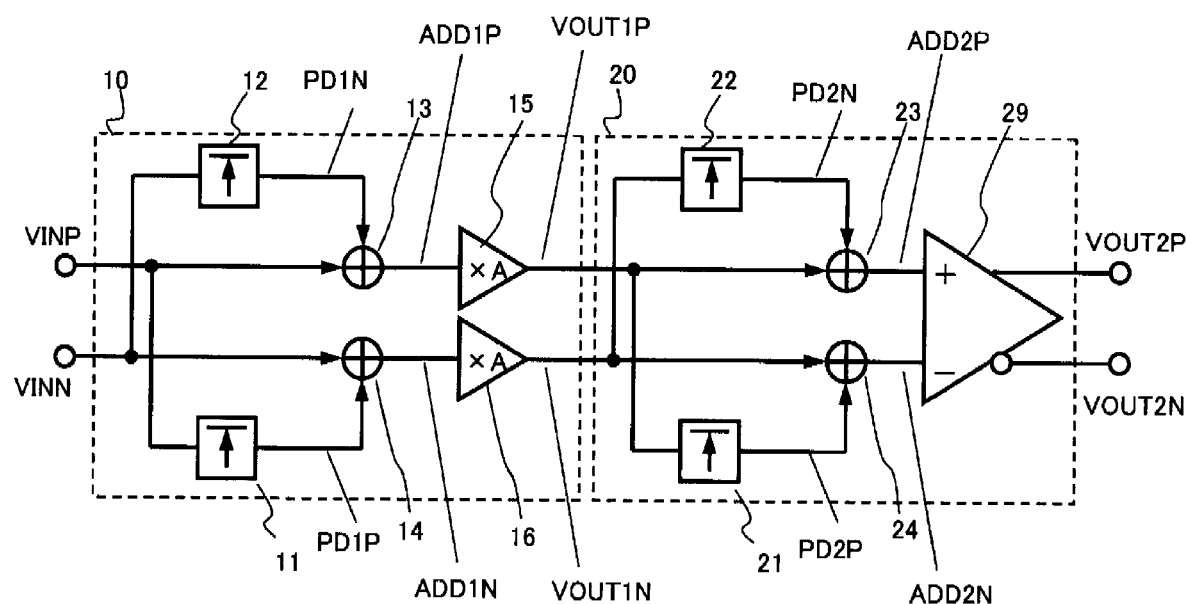
FIG. 1 is a block diagram showing a configuration of a signal amplifier circuit according to a first example of the present invention.

According to a second aspect, a signal amplifier circuit includes a first-stage amplifying unit and a second-stage amplifying unit connected to an output of the first-stage amplifying unit. That is, the first-stage amplifying unit comprises the signal amplifier circuit of the first aspect aforementioned. Preferably, gains of the first and second amplifiers are equal. The first and second amplifiers are non-inverting amplifiers that output a positive-phase output signal and a negative-phase output signal, respectively, or inverting amplifiers that output the negative-phase output signal and the positive-phase output signal, respectively.

According to a third aspect, the second-stage amplifying unit includes: a third level holding circuit that receives the positive-phase output signal output by the first amplifying unit; a fourth level holding circuit that receives the negative-phase output signal output by the first-stage amplifying unit; a third adder that adds the positive-phase output signal and an output signal of the fourth level holding circuit; a fourth adder that adds the negative-phase output signal and an output signal of the third level holding circuit; and a (second) differential amplifier that amplifies a difference signal between an output signal of the third adder and an output signal of the fourth adder.

Further, the first adder may add a signal obtained by multiplying a difference signal between the output of the second level holding circuit and the output of the first level holding circuit by a given gain to the positive-phase input signal and the output signal of the second level holding circuit. The second adder may add the signal obtained by multiplying the difference signal by the given gain to the negative-phase input signal and the output signal of the first level holding circuit. The given gain is herein not less than 0 and not more than 1. Preferably, the gain is not less than 0.29 and not more than 0.71. More preferably, the gain is about 0.5.

Each of the first to fourth level holding circuits holds any one of peak and bottom values of the input signal.

In the aspects of the present invention, various modes may be implemented.

According to a first mode, the first adder adds a signal, obtained by multiplying a difference signal between output signals of the second level holding circuit and the first level holding circuit by a given gain, to the positive-phase input signal and the output signal of the second level holding circuit; and the second adder adds a signal obtained by multiplying the difference signal by the given gain, to the negative-phase input signal and the output signal of the first level holding circuit.

According to a second mode, the given gain is not less than 0 and not more than 1.

According to a third mode, the first adder is formed of a first resistance element pair of series-connected resistance elements, the positive-phase input signal being supplied to one end of the first resistance element pair, the output signal of the second level holding circuit being supplied to the other end of the first resistance element pair, and an intermediate node of the first resistance element pair being connected to an input of the first amplifier; and the second adder is formed of a second resistance element pair of series-connected resistance elements, the negative-phase input signal being supplied to one end of the second resistance element pair, the output signal of the first level holding circuit being supplied to the other end of the second resistance element pair, and an intermediate node of the second resistance element pair being connected to an input of the second amplifier.

According to a fourth mode, two resistance values of the first resistance element pair are equal to each other; and two resistance values of the second resistance element pair are equal to each other.

According to a fifth mode, the signal amplifier circuit comprises: a first differential amplifier that outputs a difference signal between output signals of the first and second level holding circuits; the first adder being formed of a first resistance element circuit comprising: a first resistance element, the positive-phase input signal being supplied to one end of the first resistance element and the other end of the first resistance element being connected to an input of the first amplifier; a second resistance element, the output of the second level holding circuit being supplied to one end of the second resistance element and the other end of the second resistance element being connected to the input of the first amplifier; and a third resistance element, an output of the first differential amplifier being supplied to one end of the third resistance element and the other end of the third resistance element being connected to the input of the first amplifier; the second adder being formed of a second resistance element circuit comprising: a fourth resistance element, the negative-phase input signal being supplied to one end of the fourth resistance element and the other end of the fourth resistance element being connected to an input of the second amplifier; a fifth resistance element, the output of the first level holding circuit being supplied to one end of the fifth resistance element and the other end of the fifth resistance element being connected to the input of the second amplifier; and a sixth resistance element, the output of the first differential amplifier being supplied to one end of the sixth resistance element and the other end of the sixth resistance element being connected to the input of the second amplifier.

According to a fifth mode, the signal amplifier circuit comprises: a first differential amplifier that outputs a difference signal between output signals of the first and second level holding circuits; the first and second amplifiers being both of a differential type; the first adder being formed of a first resistance element circuit comprising: a first resistance element, the positive-phase input signal being supplied to one end of the first resistance element and the other end of the first resistance element being connected to a positive-phase input of the first amplifier; a second resistance element, an output of the second level holding circuit being supplied to one end of the second resistance element and the other end of the second resistance element being connected to the positive input of the first amplifier; and a third resistance element, the output of the first differential amplifier being supplied to one end of the third resistance element and the other end of the third resistance element being connected to a negative-phase input of the first amplifier; the second adder being formed of a second resistance element circuit comprising: a fourth resistance element, the negative-phase input signal being supplied to one end of the fourth resistance element and the other end of the fourth resistance element being connected to an input of the second non-inverting amplifier; a fifth resistance element, the output of the first level holding circuit being supplied to one end of the fifth resistance element and the other end of the fifth resistance element being connected to the input of the second non-inverting amplifier; and a sixth resistance element, the output of the first differential amplifier being supplied to one end of the sixth resistance element and the other end of the sixth resistance element being connected to a negative-phase input of the second amplifier.

According to a sixth mode, resistance values of the first and second resistance elements are equal to each other; a product of a resistance value of the third resistance element and a gain of the first differential amplifier assumes a predetermined value with respect to a resistance value of the first or second resistance element; resistance values of the fourth and fifth resistance elements are equal to each other; a product of a resistance value of the sixth resistance element and the gain of the first differential amplifier assumes the predetermined value with respect to a resistance value of the fourth or fifth resistance element; and the predetermined value is a value not less than 0 and not more than 1.

The predetermined value may be not less than 0.29 and not more than 0.71, more preferably, about 0.5.

According to a seventh mode, a gain of the first differential amplifier is not less than 0 and not more than 1; resistance values of the first, second, and third resistance elements are equal to one another; and resistance values of the fourth, fifth, and sixth resistance elements are equal to one another.

The gain of the first differential amplifier may be not less than 0.29 and not more than 0.71, preferably, about 0.5.

According to an eighth mode, the first amplifier is a non-inverting amplifier that outputs the positive-phase output signal; and the second amplifier is a non-inverting amplifier that outputs the negative-phase output signal.

The first amplifier may be an inverting amplifier that outputs the negative-phase output signal; and the second amplifier may be an inverting amplifier that outputs the positive-phase output signal.

A resistance element may be connected between input and output of the first inverting amplifier, and a resistance element is connected between input and output of the second inverting amplifier.

According to a ninth mode, each of the first to fourth level holding circuits holds any one of peak and bottom values of the input signal.

According to a tenth mode, there is provided an optical receiver comprising: a photodetector; a pre-amplifier that converts an output current of the photodetector to differential output signals; and the signal amplifier circuit according said aspects and modes; the pre-amplifier outputting the differential output signals to the signal amplifier circuit as the positive-phase input signal and the negative-phase input signal.

When the signal amplifier circuit as described above receives a signal that includes a tail generated at a photodetector, the peak value of an envelope of the positive-phase input signal becomes constant without any increase or decrease, and the peak value of an envelope of the negative-phase input signal monotonously increases, in the second-stage amplifying unit. For this reason, even when the tail is present, both of the signals corresponding to peak and bottom value of an output current of the photodetector can be held by the peak value holding circuits alone. Accordingly, highly accurate unipolar to bipolar signal conversion can be performed with a simple circuit including only the peak and hold circuits and the amplifiers, and a digital binary signal can be received without code error.

Further, a difference signal between the output signal of the first adder and the output signal of the second adder in the first-stage amplifying unit becomes a bipolar signal. For this reason, even when a large input signal is input and the first and second amplifiers operate as limiter amplifiers, duty ratios of the output signals do not deteriorate.

By using the signal amplifier circuit having such a configuration in an optical receiver, a small-amplitude signal embedded in the tail immediately after a large-amplitude burst, output by the photodetector, can be received without error. Thus, the optical receiver with a wide input dynamic range can be implemented with a simple circuit. A detailed description will be given below in connection with examples, with reference to drawings.

First Example

FIG. 1 is a block diagram showing a configuration of a signal amplifier circuit according to a first example of the present invention. Referring to FIG. 1, the signal amplifier circuit includes an amplifying unit 10 in a first stage and an amplifying unit 20 in a second stage connected to an output of the amplifying unit 10. The amplifying unit 10 of the first stage includes a (first) peak value holding circuit 11 that receives a positive-phase input signal VINP, a (second) peak value holding circuit 12 that receives a negative-phase input signal VINN, an adder 13 that adds the positive-phase input signal VINP and an output signal PDIN of the (second) peak value holding circuit 12, an adder 14 that adds the negative-phase input signal VINN and an output signal PD1P of the (first) peak value holding circuit 11, an (first) non-inverting amplifier 15 that amplifies an output signal ADD1P of the adder 13, and a (second) non-inverting amplifier 16 that amplifies an output signal ADD1N of the adder 14.

The amplifying unit 20 includes a peak value hold circuit 21 that receives a positive-phase output signal VOUT1P output by the non-inverting amplifier 15, a peak value holding circuit 22 that receives a negative-phase output signal VOUT1N output by the inverting amplifier 16, an adder 23 that adds the positive-phase output signal VOUT1P and an output signal PD2N of the peak value holding circuit 22, an adder 24 that adds the negative-phase output signal VOUT1N and an output signal PD2P of the peak value holding circuit 21, and a differential amplifier 29 that amplifies a difference between an output signal ADD2P of the adder 23 and an output signal ADD2N of the adder 24.

Figure 2:
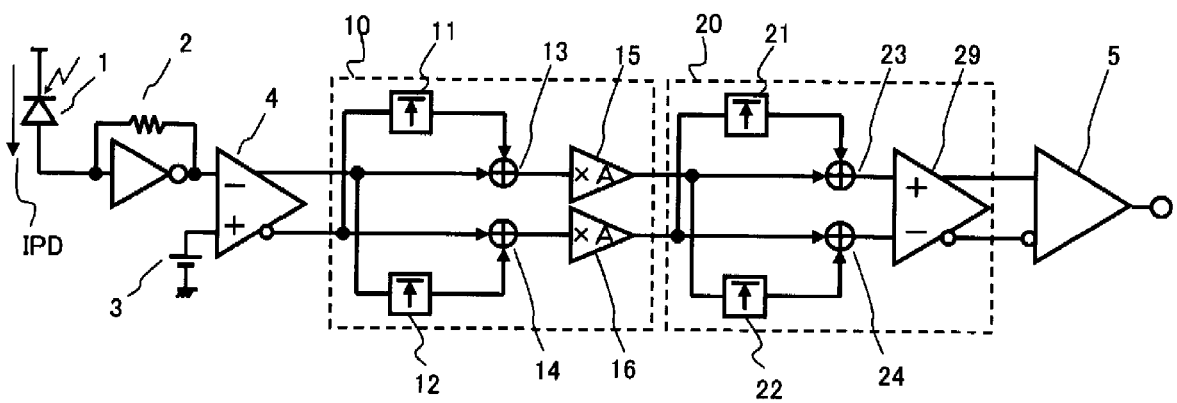
FIG. 2 is a block diagram showing a configuration of an optical receiver that uses the signal amplifier circuit according to the first example of the present invention.

FIG. 2 is a block diagram of an optical receiver that uses the signal amplifier circuit shown in FIG. 1. Referring to FIG. 2, a stage before the signal amplifier circuit shown in FIG. 1 includes a photodetector 1 that converts an optical signal to a current signal IPD, a transimpedance amplifier 2 that converts the current signal IPD output by the photodetector 1 to a single-end voltage signal, and a single-end-to-differential converter circuit 4 that converts the single-end voltage signal to differential voltage signals by connecting a positive-phase input terminal thereof to a reference voltage generation unit 3 and connecting a negative-phase input terminal thereof to an output of the transimpedance amplifier 2. In a stage subsequent to the signal amplifier circuit, a comparator 5 that outputs "1" when the positive-phase output signal of the amplifying unit 20 is larger than the negative-phase output signal of the amplifying 20 and outputs "0" when the negative-phase output of the amplifier 20 is larger than the positive-phase output of the amplifier 20.

Figure 4:
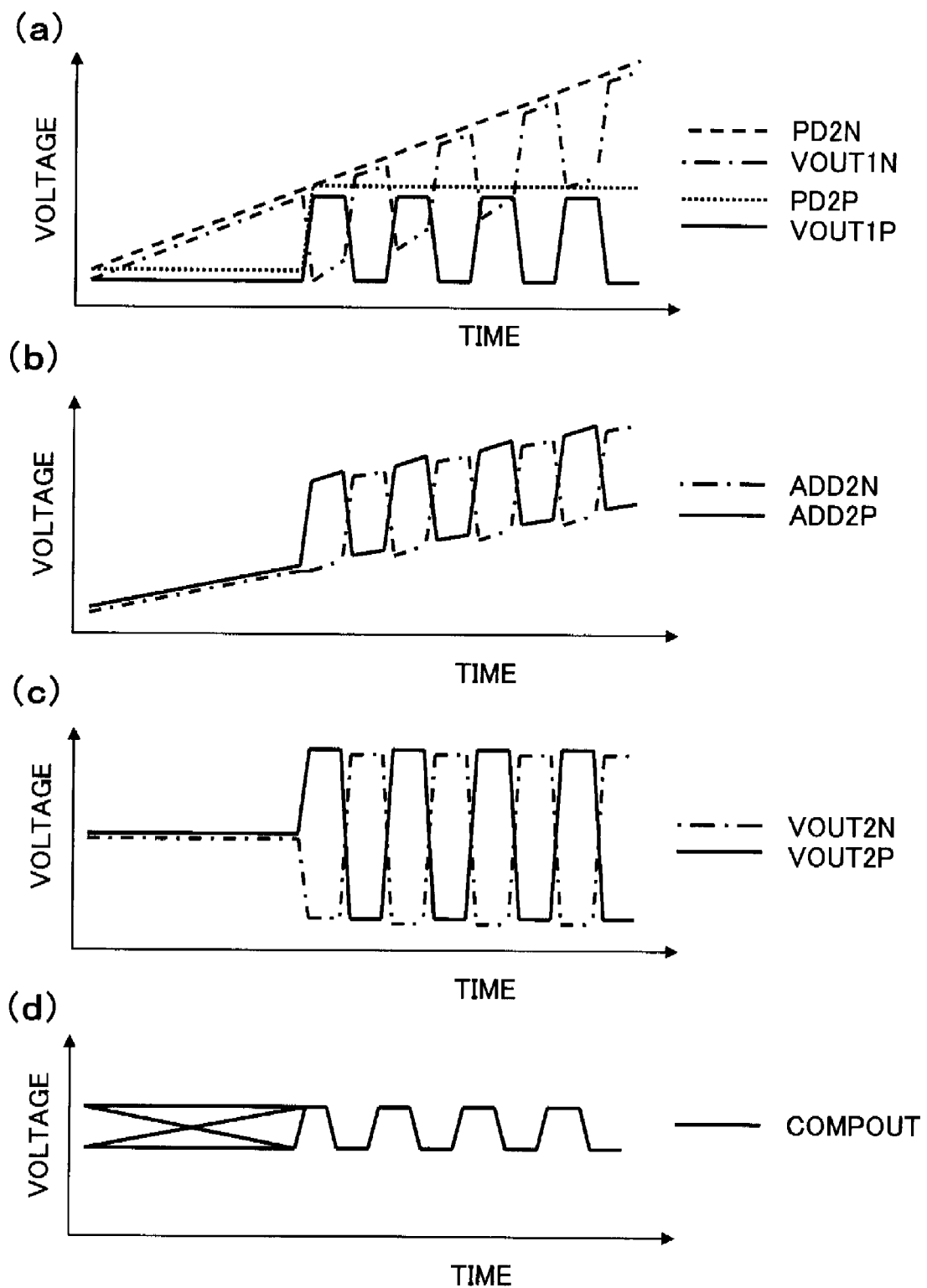
FIG. 4 is a second diagram showing signal waveforms of respective portions of the signal amplifier circuit according to the first example of the present invention.

FIGS. 3 and 4 are diagrams showing signal waveforms of respective portions of the signal amplifier circuit when the photodetector 1 emits the current signal IPD with a tail. The current signal IPD is converted to the positive-phase input signal VINP and the negative-phase input signal VINN, which are a differential voltage signal pair, through the transimpedance amplifier 2 and the single-end-to-differential converter circuit 4. Due to application (input) of the tail at the optical detector 1, an envelope of the positive-phase input signal VINP monotonously decreases, while an envelope of the negative-phase input signal VINN monotonously increases. For this reason, the output signal PD1N that indicates a peak value held in the peak value holding circuit 12 follows the tail, i.e., to follow the peak value of the signal amplitude. On contrast therewith, the output signal PD1P that indicates a peak value held in the peak value hold circuit 11 does not reflect the signal amplitude peak value (FIG. 3(b)). As a result of the addition on these signals by the adders 13 and 14, respectively, the output signal ADD1N of the adder 14 becomes a signal with a monotonously increasing envelope, while the output signal ADD1P of the adder 13 becomes a signal with a constant envelope (FIG. 3(c)). For this reason, the negative-phase output signal VOUT1N obtained by amplifying the output signal ADD1N of the adder 14 by the non-inverting amplifier 16 also becomes a signal with a monotonously increasing envelope. Further, the positive-phase output signal VOUT1P obtained by amplifying the output signal ADD1P of the adder 13 by the non-inverting amplifier 15 also becomes a signal with a constant envelope (FIG. 4(a)).

FIG. 4 shows waveforms of PD2N, VOUT1N, PD2P and VOUT1P at (a); waveforms of ADD2N and ADD2P at (b); waveforms of VOUT2N and VOUT2P at (c); and an end output waveform of COMPOUT at (d), respectively.

The differential signal pair of these positive-phase output signal VOUT1P and the negative-phase output signal VOUT1N is input to the amplifying unit 20. The envelope of the negative-phase output signal VOUT1N monotonously increases, and the envelope of the positive-phase output signal VOUT1P is constant, without increase or decrease. Accordingly, both of the peak value holding circuits 21 and 22 within the amplifying unit 20 hold desired peak values, and the output signals PD2P and PD2N are obtained. By addition of the adders 23 and 24 within the amplifying unit 20, the output signals ADD2P and ADD2N are obtained, respectively. Each of the output signals PD2P and PD2N hold a desired peak value. Accordingly, a difference voltage between output signals VOUT2P and VOUT2N obtained by amplification of a difference voltage between the output signals ADD2P and ADD2N by the differential amplifier 29 becomes bipolar signals with high accuracy. By comparing these signals by the comparator 5, a binary digital signal COMPOUT with a satisfactory duty ratio can be obtained as an output of the comparator 5 even when the photodetector 1 emits the current signal IPD with the tail.

Figure 24:
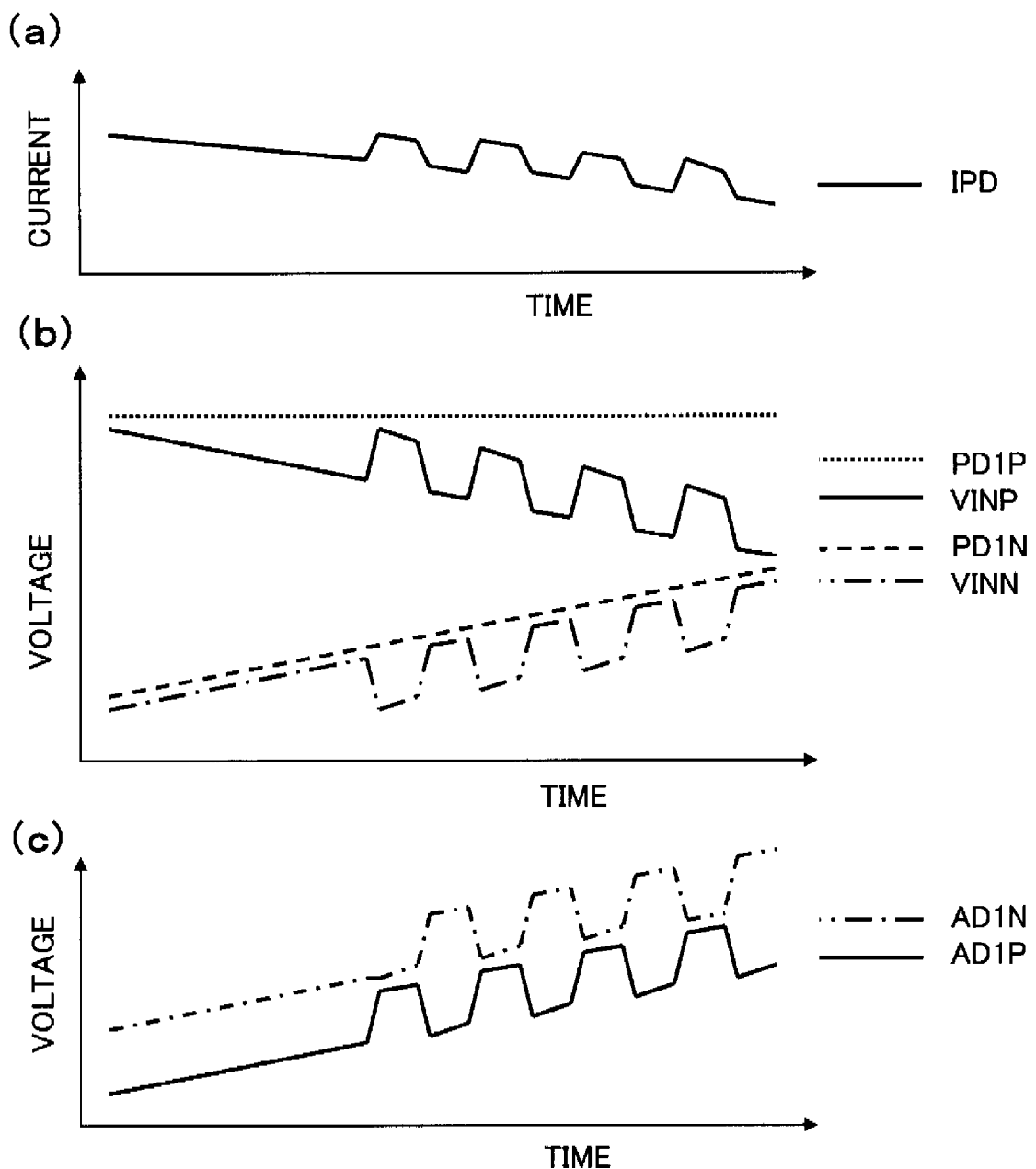
FIG. 24 is a first diagram showing operation waveforms of respective portions of the conventional optical receiver.
Figure 25:
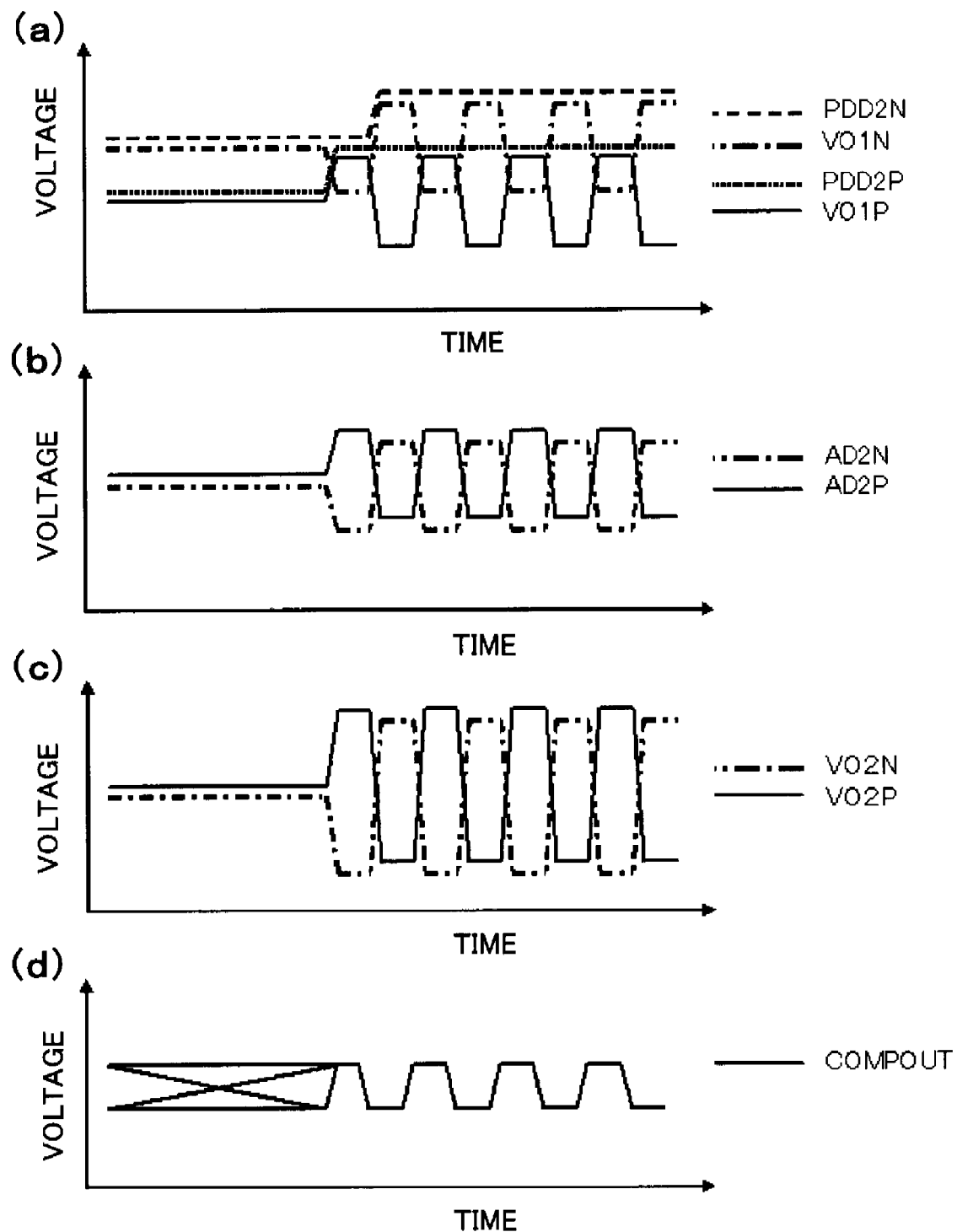
FIG. 25 is a second diagram showing operation waveforms of the respective portions of the conventional optical receiver.

When a high-frequency signal amplitude of each of the positive-phase input signal VINP and the negative-phase input signal VINN is sufficiently larger than an amplitude of the tail, the amplifying unit (first stage) 10 substantially functions as a unipolar to bipolar signal converter circuit in a region where the non-inverting amplifiers 15 and 16 linearly operate. The maximum amplitude of the tail does not depend on the high-frequency signal amplitude of each of the positive-phase input signal VINP and the negative-phase input signal VINN, and assumes a constant value. For this reason, when the amplitude of each of the positive-phase input signal VINP and the negative-phase input signal VINN is large, the high-frequency signal amplitude of each of the positive-phase input signal VINP and the negative-phase input signal VINN becomes large, and the amplitude of the tail becomes unchanged. Accordingly, when the amplitude of each of the positive-phase input signal VINP and the negative-phase input signal VINN is large, duty ratio deterioration will not occur as long as the non-inverting amplifiers 15 and 16 linearly operate. In this example, as clear from comparison between FIGS. 3 and 24 subject to ignoring amplitude of the tail, amplitudes of the output signals ADD1P and ADD1N applied to the non-inverting amplifiers 15 and 16, respectively, when the positive-phase input signal VINP and the negative-phase input signal VINN of a given level are input, are one half of input amplitudes applied to an amplifier 139 in a conventional art if the amplitudes are in-phase amplitudes. In case where the amplitudes of the output signals ADD1P and ADD1N are differential amplitudes, the amplitudes of the output signals ADD1P and ADD1N applied to the non-inverting amplifiers 15 and 16, respectively, when the positive-input input signal VINP and the negative-phase input signal VINN of a given level are input, are equal to the input amplitudes applied to the amplifier 139 in the conventional art. Accordingly, when an amplifier with an in-phase input dynamic range thereof strictly limited is applied to each of the non-inverting amplifiers 15 and 16, the input amplitudes of the positive-phase input signal VINP and the negative-phase input signal VINN that operate without causing the duty ratio deterioration can be set to be twice as large as those for an amplifier having a comparable in-phase dynamic range, used as the differential amplifier 139 in the conventional art. That is, a dynamic range upper limit caused by limitation of the in-phase input dynamic range of the differential amplifier in the conventional art can be improved by 6 dB. Output signals AD1P and AD1N in FIG. 24 can be compared to the output signal ADD1P and ADD1N, respectively.

Second Example

Figure 5:
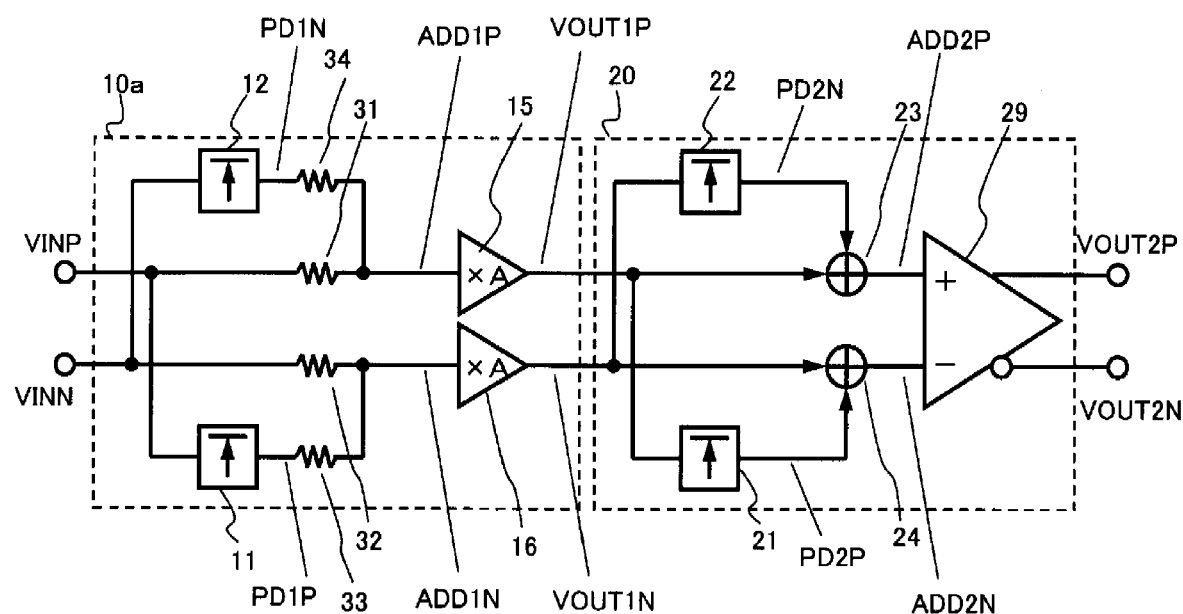
FIG. 5 is a block diagram showing a configuration of a signal amplifier circuit according to a second example of the present invention.

FIG. 5 is a block diagram showing a configuration of a signal amplifier circuit according to a second example of the present invention. In an amplifying unit 10a in FIG. 5, a resistive voltage division circuit is formed in place of the adder 13 shown in FIG. 1. The resistive voltage division circuit is formed of a resistance 31 with the positive-phase input signal VINP supplied to one end thereof and other end thereof connected to an input terminal of the non-inverting amplifier 15 and a resistance 34 with one end thereof connected to an output of the peak value holding circuit 12 and the other end connected to the input terminal of the non-inverting amplifier 15. Further, a resistive voltage division circuit is formed in place of the adder 14 shown in FIG. 1. The resistive voltage division circuit is formed of a resistance 32 with the negative-phase input signal VINN supplied to one end thereof and other end thereof connected to an input terminal of the non-inverting amplifier 16 and a resistance 33 with one end thereof connected to an output of the peak value holding circuit 11 and the other end connected to the input terminal of the non-inverting amplifier 16. It is assumed herein that values of the resistance 31 and the resistance 34 are equal and that values of the resistance 32 and the resistance 33 are equal. Referring to FIG. 5, the configuration except the adders 13 and 14 in FIG. 1 is the same as in FIG. 1. As described above, in the signal amplifier circuit according to the second example, the adders are formed just by the simple resistive voltage division circuits.

Operations of respective portions of the signal amplifier circuit according to the second example are the same as those in FIG. 1, and operation waveforms of the respective portions are shown in FIGS. 3 and 4, as in the first example. The reason why the problems of the known art are solved is the same as in the first example.

Third Example

Figure 6:
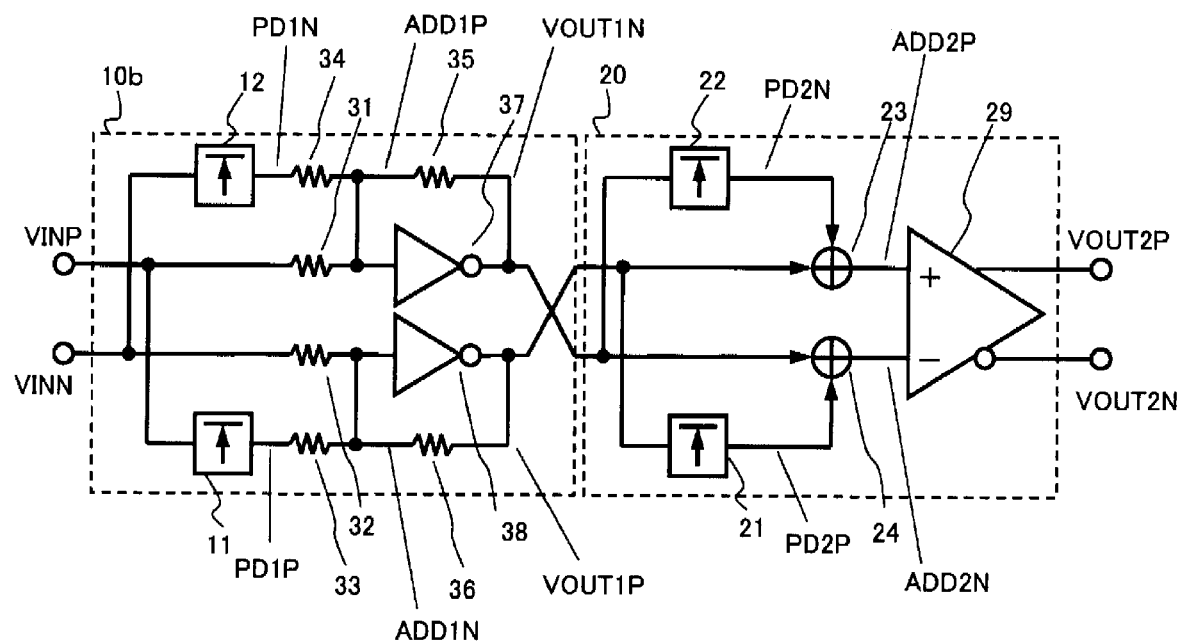
FIG. 6 is a block diagram showing a configuration of a signal amplifier circuit according to a third example of the present invention.

FIG. 6 is a block diagram showing a configuration of a signal amplifier circuit according to a third example of the present invention. Referring to an amplifying unit (first stage) 10b in FIG. 6, a transimpedance amplifier formed of an inverting amplifier 37 and a resistance 35 is used in place of the non-inverting amplifier 15 in FIG. 5. The inverting amplifier 37 receives an input (an output of the adder) at a connecting point between the resistance 31 and the resistance 34 and outputs the negative-phase output signal VOUT1N of the amplifying unit 10b. The resistance 35 connects input and output terminals of the inverting amplifier 37. Referring to FIG. 6, a transimpedance amplifier formed of an inverting amplifier 38 and a resistance 36 is used in place of the non-inverting amplifier 16 in FIG. 5. The inverting amplifier 38 receives an input (an output of the adder) at a connecting point between the resistance 32 and the resistance 33 and outputs a positive-phase output signal VOUT1P of the inverting amplifier 38. The resistance 36 connects input and output terminals of the inverting amplifier 38. The configuration except these transimpedance amplifiers is the same as in the second example.

Operations of the respective portions of the signal amplifier circuit according to the third example are the same as those in the first and second examples, and operation waveforms of the respective portions are shown in FIGS. 3 and 4, as in the first and second examples. The reason why the problems of the known art are solved is also the same as in the first and second examples.

In the first example, respective impedances at input nodes of the adders 13 and 14 increase. Accordingly, bandpass reduction caused by a parasitic capacitance tends to occur at each input node, and an upper limit of a practical operating speed is approximately 1 Gbps. On contrast therewith, in the third example, the transimpedance amplifier is connected to each input node, and the impedance at each input node is therefore kept to be low. Accordingly, the bandpass reduction caused by the parasitic capacitance at each input node is reduced, and implementation of a high-speed operation that greatly exceeds 2 Gbps is facilitated.

Fourth Example

Figure 7:
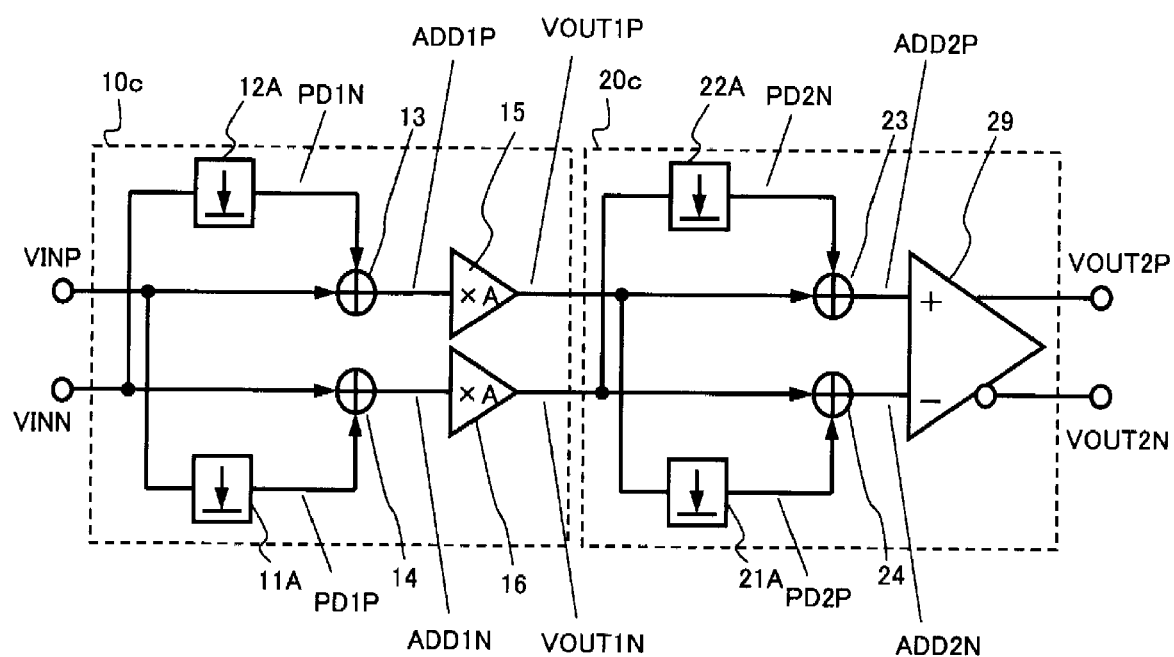
FIG. 7 is a block diagram showing a configuration of a signal amplifier circuit according to a fourth example of the present invention.

FIG. 7 is a block diagram showing a configuration of a signal amplifier circuit according to a fourth example of the present invention. Referring to FIG. 7, in place of the peak value holding circuits 11 and 12 in the amplifying unit 10 in FIG. 1, bottom value holding circuits 11A and 12A in an amplifying unit 10c are used, respectively. In place of the peak value holding circuits 21 and 22 in the amplifying unit 20 in FIG. 1, bottom value holding circuits 21A and 22A in an amplifying unit 20c are used, respectively. The configuration except for use of the bottom value holding circuits in place of the peak value holding circuits is the same as in the first example.

Figure 8:
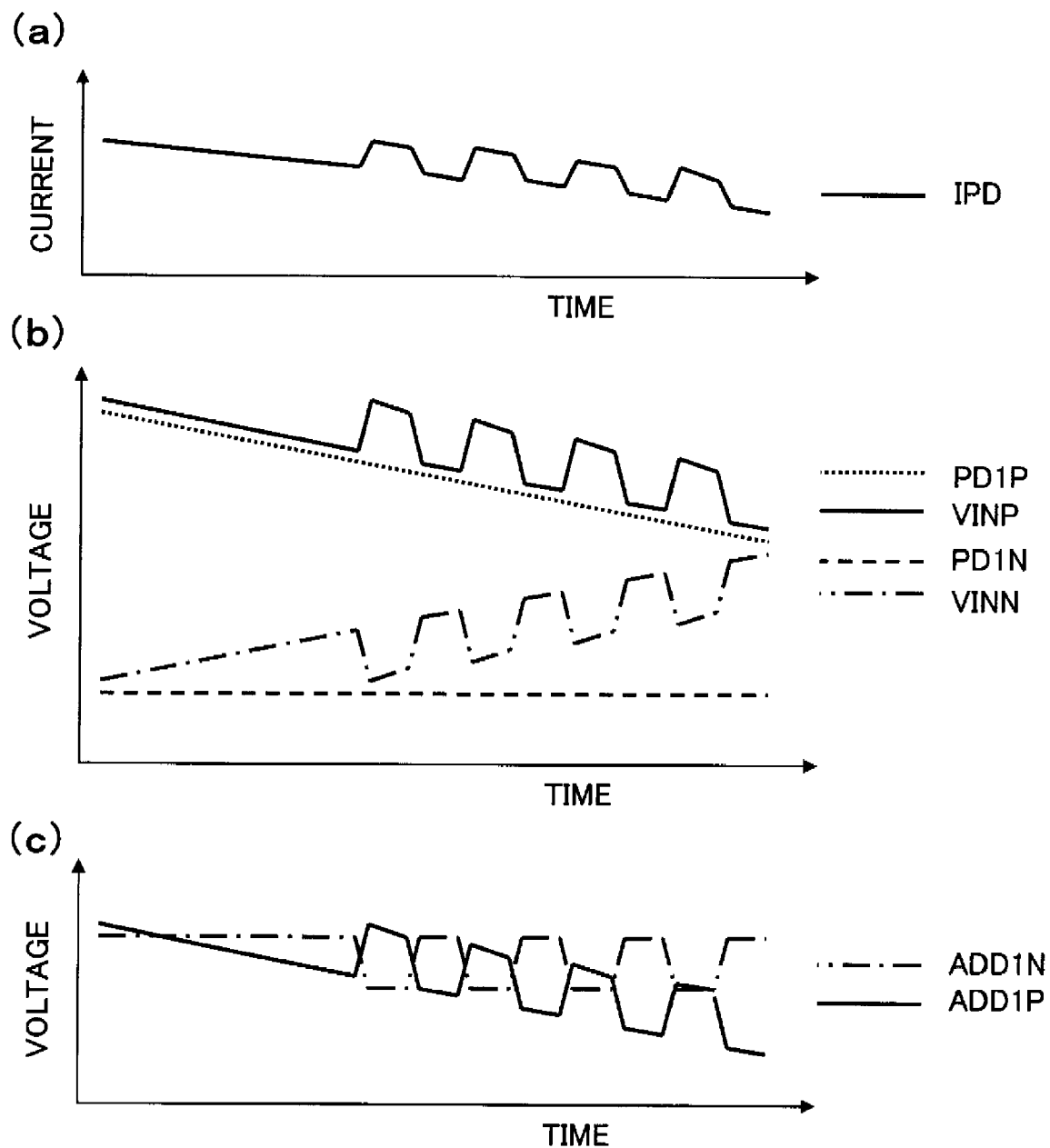
FIG. 8 is a first diagram showing operation waveforms of respective portions of the signal amplifier circuit according to the fourth example of the present invention.
Figure 9:
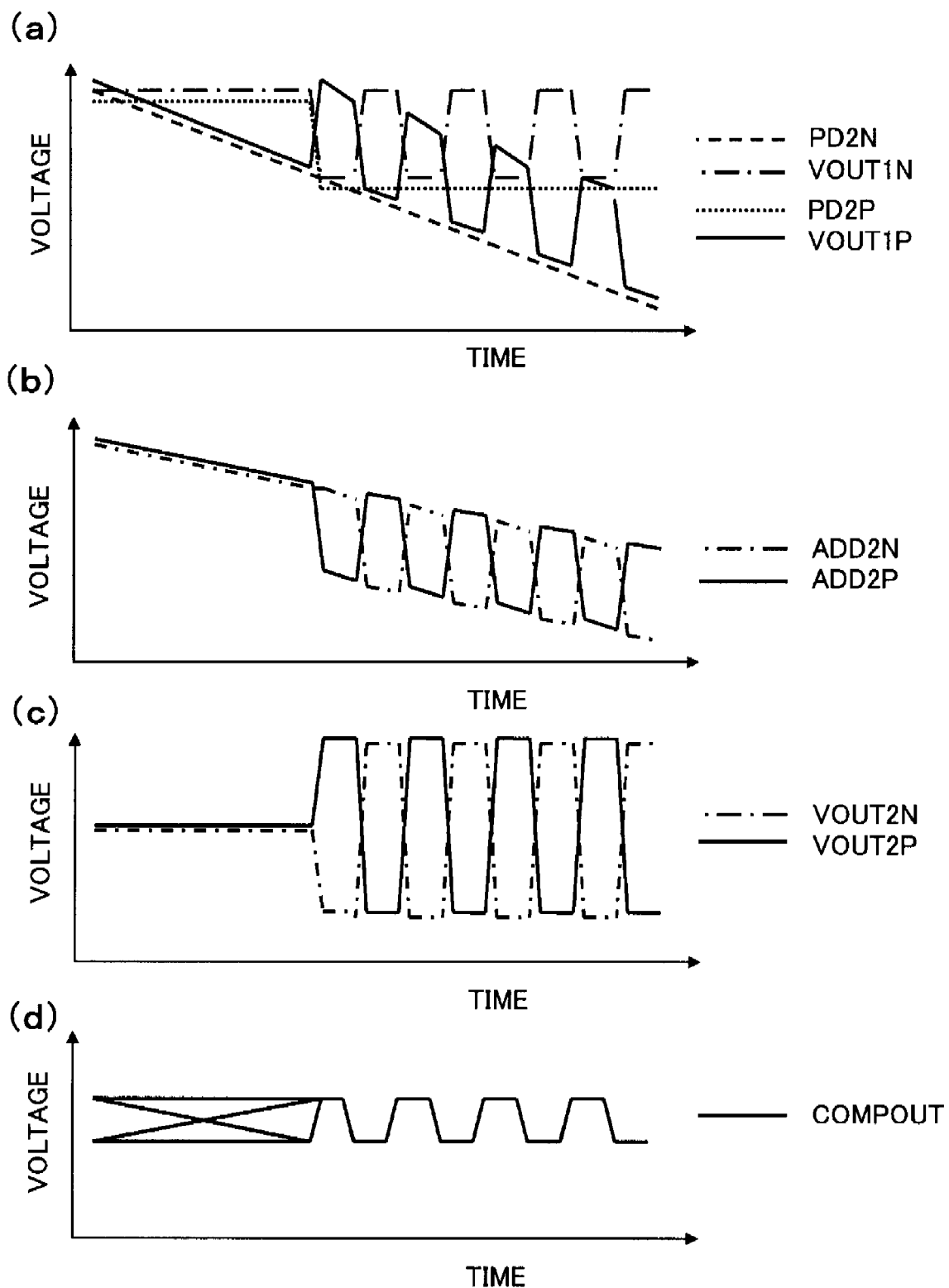
FIG. 9 is a second diagram showing operation waveforms of respective portions of the signal amplifier circuit according to the fourth example of the present invention.

FIGS. 8 and 9 are diagrams showing operating waveforms of respective portions in FIG. 7 when the photodetector 1 outputs a current signal IPD with a tail. Since the bottom value holding circuits are used in place of the peak value holding circuits, envelopes of the signals in the respective portions that monotonously increases in FIG. 4 monotonously decrease in FIG. 9. The bottom value detecting circuits capture the envelopes that will monotonously decrease, thereby performing the same, highly accurate unipolar to bipolar signal conversion as in the first example.

Fifth Example

Figure 10:
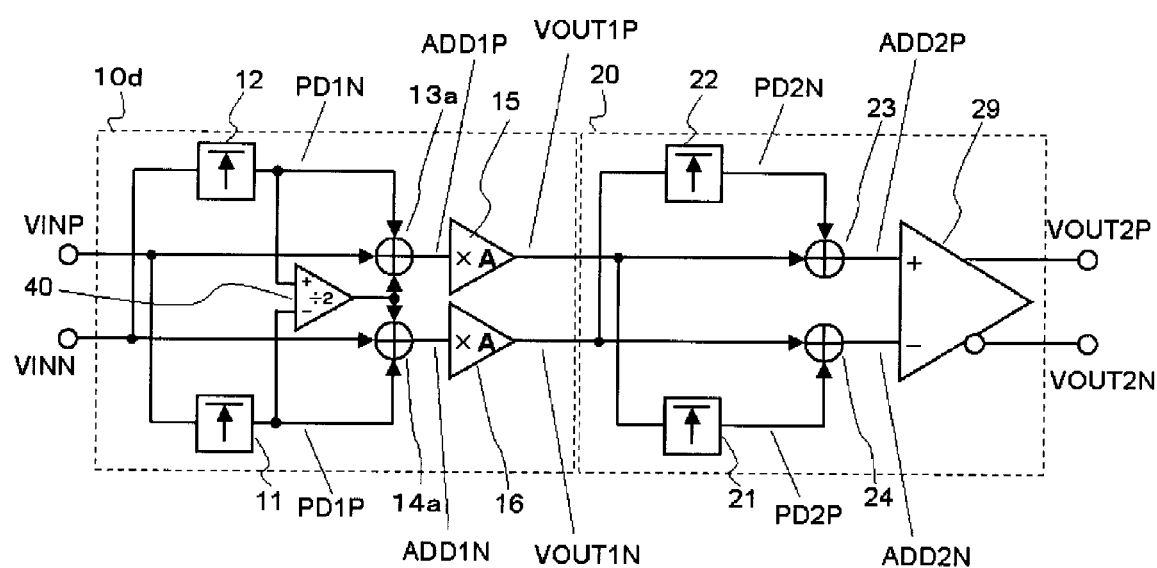
FIG. 10 is a block diagram showing a configuration of a signal amplifier circuit according to a fifth example of the present invention.

FIG. 10 is a block diagram showing a configuration of a signal amplifier circuit according to a fifth example of the present invention. Referring to FIG. 10, same reference numerals as those in FIG. 1 indicate same components. Thus, descriptions of the same components will be omitted. The signal amplifier circuit includes an amplifying unit 10d in a first stage and an amplifying unit 20 in a second stage connected to an output of the amplifying unit 10d. The amplifying unit 10d includes the peak value holding circuit 11 that receives the positive-phase input signal VINP, the peak value holding circuit 12 that receives the negative-phase input signal VINN, a differential amplifier 40 that multiplies a signal obtained by subtracting an output signal of the peak value holding circuit 11 from an output signal of the peak value holding circuit 12 by a gain of ½ and outputs a resulting signal to adders 13a and 14a, respectively, an adder 13a that adds the positive-phase input signal VINP, the output signal PDIN of the peak value holding circuit 12, and the output signal of the differential amplifier 40, and an adder 14a that adds the negative-phase input signal VINN, the output signal PD1P of the peak value holding circuit 11, and the output signal of the differential amplifier 40. The non-inverting amplifier 15 amplifies the output signal ADD1P of the adder 13a, while the non-inverting amplifier 16 amplifies the output signal ADD1N of the adder 14a.

A gain of the differential amplifier 40 is not less than 0 and not more than 1, preferably not less than 0.29 and not more than 0.71, and more preferably approximately 0.5. A case where the gain of the differential amplifier 40 is 0 corresponds to the first example. Generally, when the gain of the differential amplifier 40 is set to A, an improved amount of the dynamic range of the amplifying unit 10d with respect to the amplifying unit 10 in FIG. 1 becomes as follows:
When $0 \leq A < 0.5$, the "improved amount" becomes $1/(1-A)$ or $-20 \log_{10}(1-A)$ in dB notation.
When $0.5 < A \leq 1$, the "improved amount" becomes $1/A$ or $-20 \log_{10}A$ in dB notation.
Preferably, the "improved amount" is usually 3 dB or more. In this case, a lower limit of the gain becomes "$1 - \frac{1}{10}^{3/20}$ (approximately 0.292)", while an upper limit of the gain becomes "$1 - \frac{1}{10}^{3/20}$ (approximately 0.708)".

Incidentally, the gain A of 0.5 is a singular point, and when the gain A is 0.5, an improvement does not remain at twice the usual improved amount (of 6 dB), and practically an improvement on the order of 10 to 20 times the usual improved amount (corresponding to 20 to 26 dB) has been confirmed. When the gain is in the vicinity of 0.5, the dynamic range for the input signal can be extended most.

Figure 11:
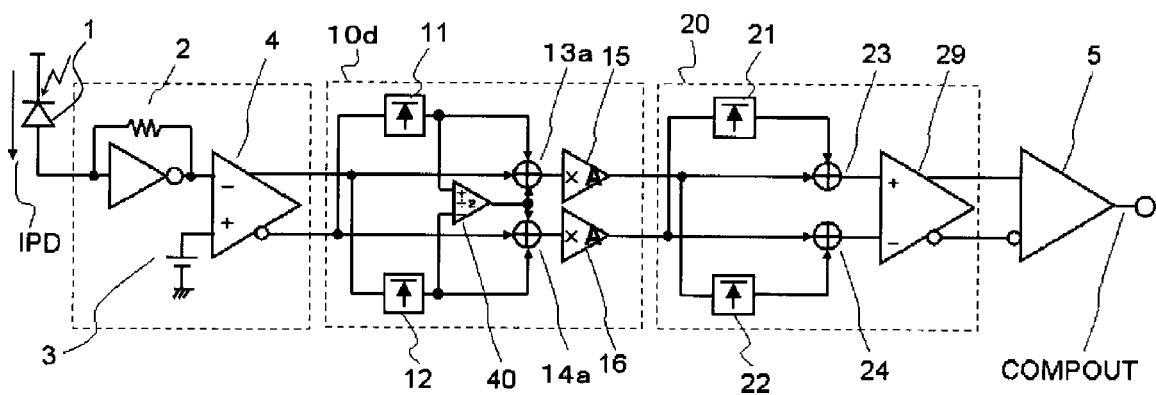
FIG. 11 is a block diagram showing an optical receiver that uses the signal amplifier circuit according to the fifth example of the present invention.

FIG. 11 is a block diagram of an optical receiver that uses the signal amplifier circuit shown in FIG. 10. Referring to FIG. 11, same reference numerals as those in FIG. 2 indicate same components as those in FIG. 2, and descriptions of the same components will be therefore omitted. Referring to FIG. 11, an amplifying unit 10d is provided in place of the amplifying unit 10 in FIG. 2.

Figure 13:
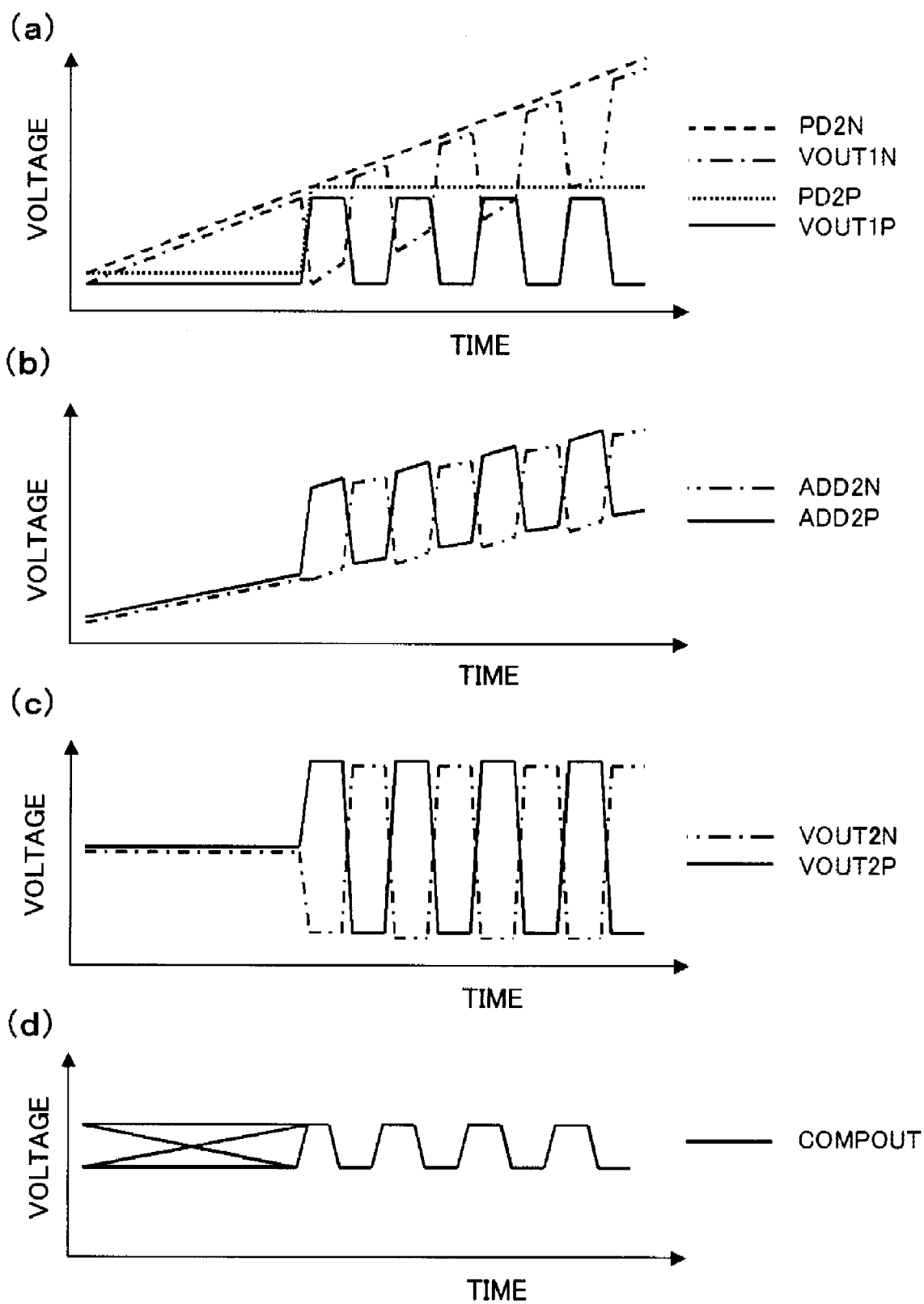
FIG. 13 is a second diagram showing signal waveforms of respective portions of the signal amplifier circuit according to the fifth example of the present invention.

FIGS. 12 and 13 are diagrams showing signal waveforms of respective portions of the signal amplifier circuit when the photodetector 1 emits the current signal IPD with a tail and an amplitude of an optical signal current to be received is smaller than that of the tail. Since FIGS. 12 and 13 are the same as FIGS. 3 and 4 described in the first example, descriptions of FIGS. 12 and 13 will be omitted.

Figure 14:
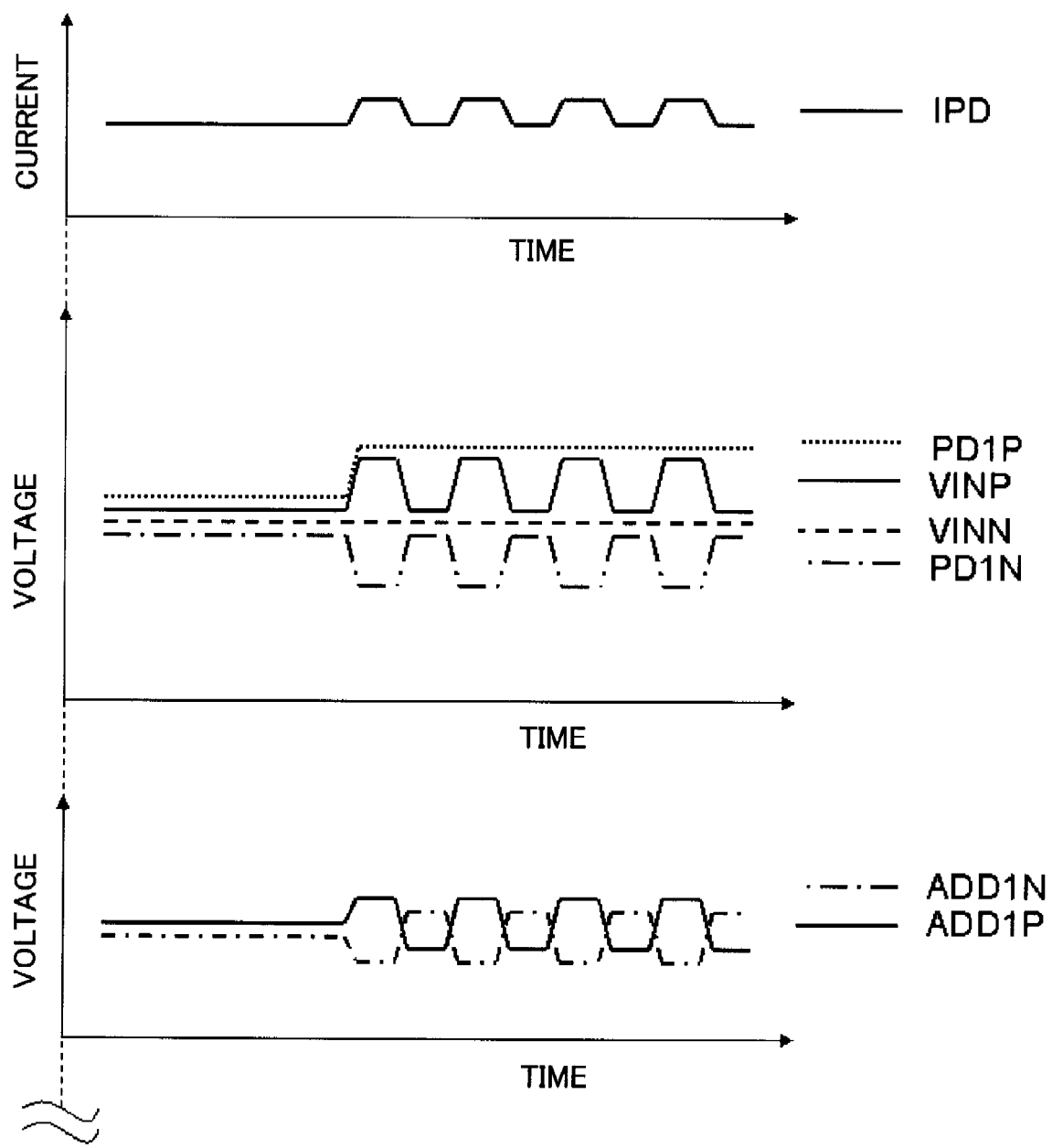
FIG. 14 is a third diagram showing signal waveforms of the respective portions of the signal amplifier circuit according to the fifth example of the present invention.
Figure 15:
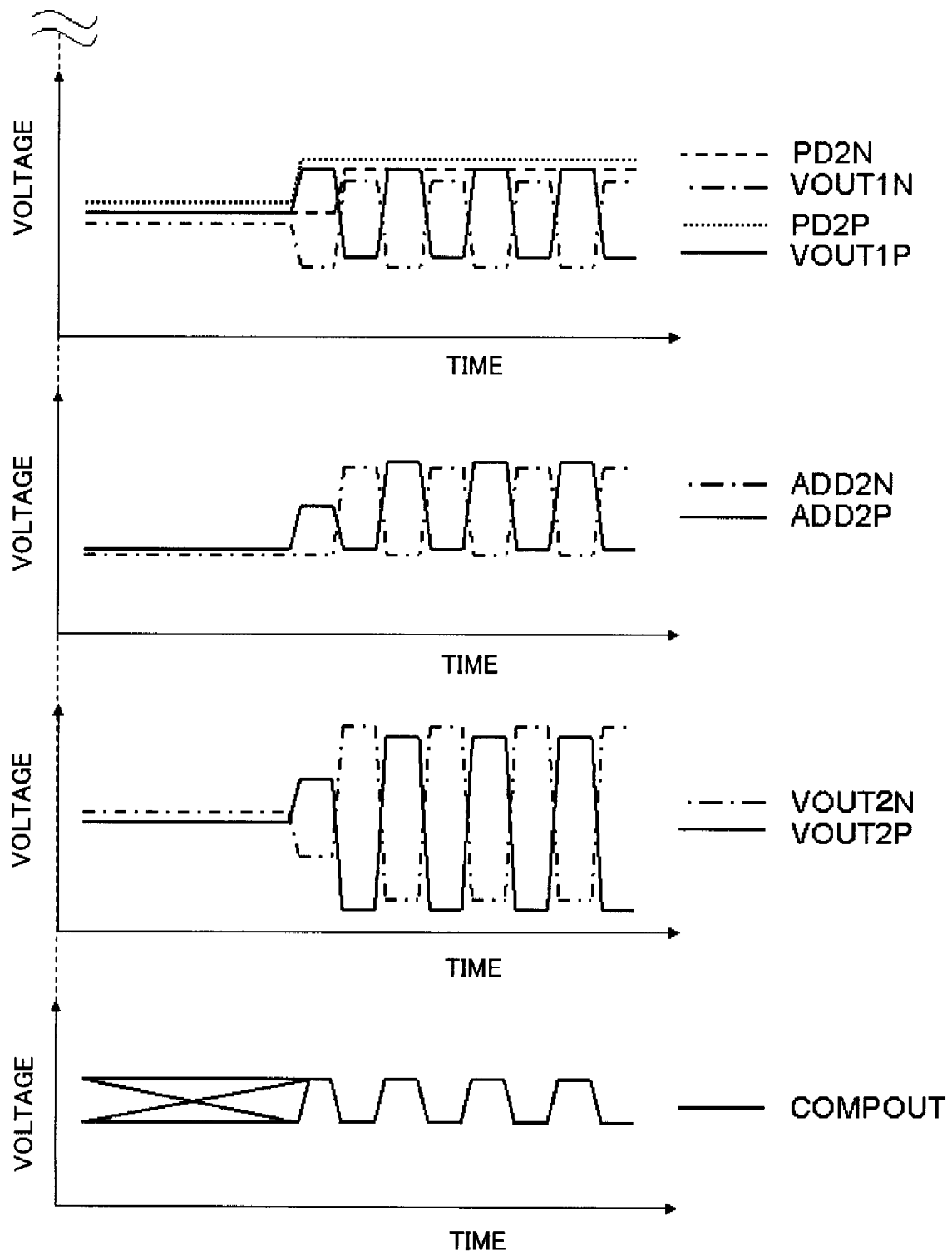
FIG. 15 is a fourth diagram showing signal waveforms of the respective portions of the signal amplifier circuit according to the fifth example of the present invention.

FIGS. 14 and 15 are diagrams showing signal waveforms of the respective portions of the signal amplifier circuit when an amplitude of the optical signal current to be received is of a sufficiently larger level than the tail, which can ignore the tail. In this case, the output signal ADD1P of the adder 13a and the output signal ADD1N of the adder 14a both become bipolar signals. Thus, even if the non-inverting amplifiers 15 and 16 operate as the limiter amplifiers, duty ratio deterioration will not occur. In other words, gains of the non-inverting amplifiers 15 and 16 can be set to be sufficiently large without considering the duty ratio deterioration by limiting when the amplitude of the optical signal current to be received is large and when the input amplitudes of the positive-phase input signal VINP and the negative-phase input signal VINN input to the amplifying unit 10d are large. Accordingly, when the photodetector 1 generates the tail and either when the amplitudes of the positive-phase input signal VINP and the negative-phase input signal VINN are small or when the amplitudes of the positive-phase input signal VINP and the negative-phase input signal VINN are large, the binary digital signal having a satisfactory duty ratio can be obtained at a response speed of the peak value holding circuit (specifically, which is equivalent to the order of several bits) within the range approximately 10 times as large as that of the conventional art, for the maximum input.

Sixth Example

Figure 16:
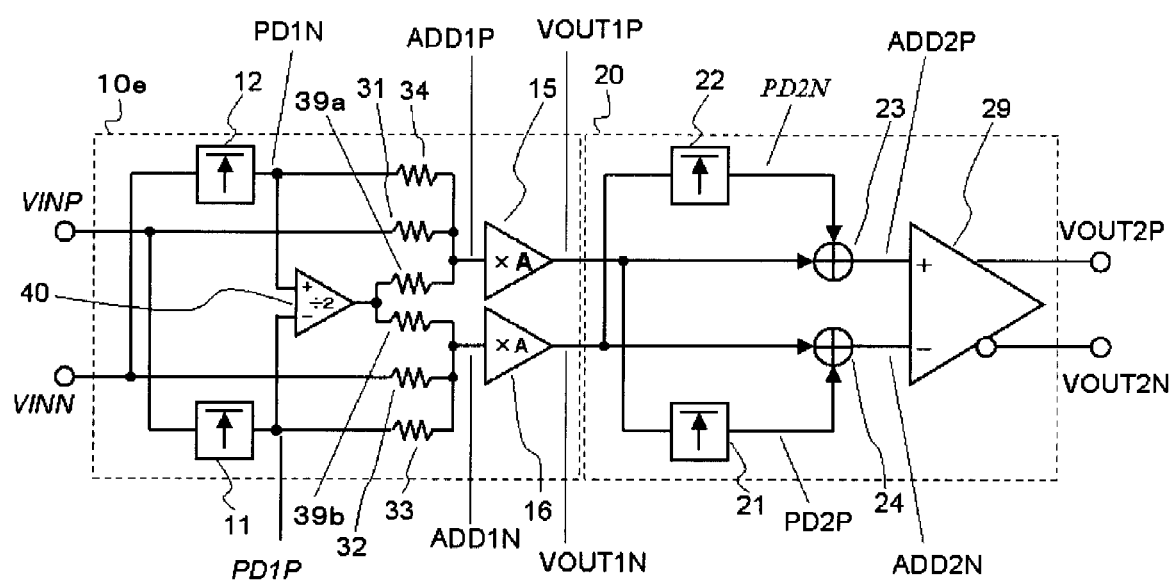
FIG. 16 is a block diagram showing a configuration of a signal amplifier circuit according to a sixth example of the present invention.

FIG. 16 is a block diagram showing a configuration of a signal amplifier circuit according to a sixth example of the present invention. In an amplifying unit 10e in FIG. 16, a resistance element circuit is formed in place of the adder 13a shown in FIG. 10. The resistance element circuit is formed of the resistance 31 with the positive-phase input signal VINP supplied to one end thereof and the other end connected to the input terminal of the non-inverting amplifier 15, the resistance 34 with one end connected to an output of the peak value holding circuit 12 and the other end connected to the input terminal of the non-inverting amplifier 15, and a resistance 39a with one end connected to an output of the differential amplifier 40 and the other end connected to the input terminal of the non-converting amplifier 15. Further, in place of the adder 14a shown in FIG. 10, a resistance element circuit is formed. The resistance element circuit is formed of the resistance 32 with the negative-phase input signal VINN supplied to one end thereof and the other end connected to the input terminal of the non-inverting amplifier 16, the resistance 33 with one end thereof connected to an output of the peak value holding circuit 11 and the other end connected to the input terminal of the non-inverting amplifier 16, and a resistance 39b with one thereof connected to the output of the differential amplifier 40 and the other end connected to the input terminal of the non-inverting amplifier 16. It is herein assumed that values of the resistance 31, the resistance 34, and the resistance 39a are equal, values of the resistance 32, the resistance 33, and the resistance 39b are equal, and the gain of the differential amplifier 40 is ½. Referring to FIG. 16, the configuration except the adders 13a and 14a in FIG. 10 is the same as in FIG. 10. As described above, in the signal amplifier circuit according to the sixth example, the adders are constituted only from the simple resistive voltage division circuits, respectively.

Operations of the respective portions of the signal amplifier circuit according to the sixth example are the same as those in the fifth example. Operation waveforms of the respective portions are shown in FIGS. 12, 13, 14, and 15, as in the fifth example. The reason why the problems of the known art are solved is the same as that in the fifth example.

Seventh Example

Figure 17:
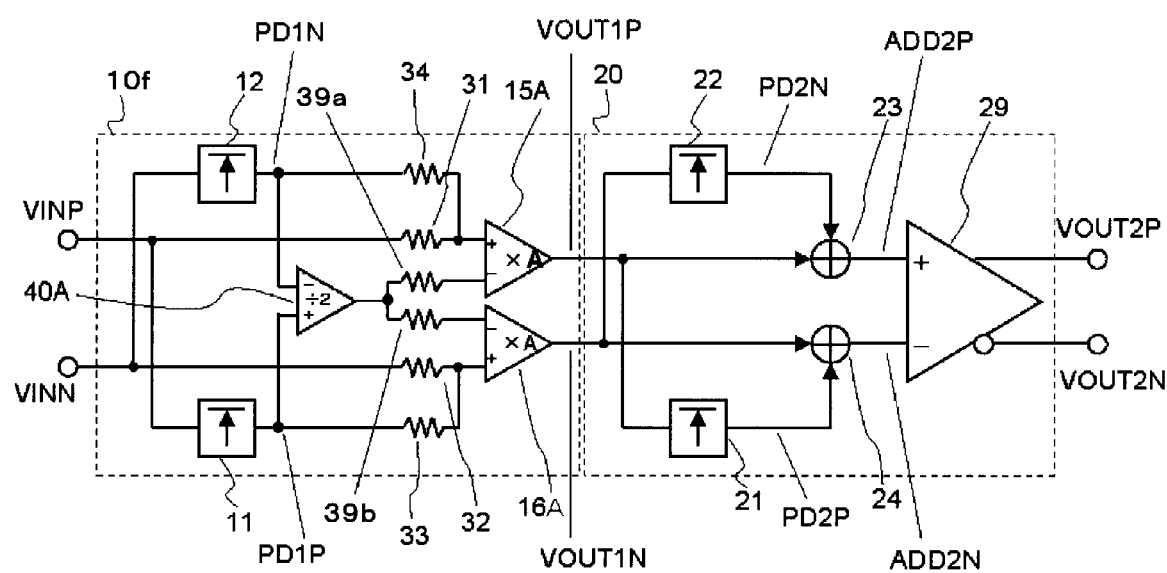
FIG. 17 is a block diagram showing a configuration of a signal amplifier circuit according to a seventh example of the present invention.

FIG. 17 is a block diagram showing a configuration of a signal amplifier circuit according to a seventh example of the present invention. Referring to an amplifying unit 10f in FIG. 17, a differential amplifier 40A subtracts the output signal of the peak value holding circuit 12 from the output signal of the peak value holding circuit 11, and a non-inverting amplifier 15A and a non-inverting amplifier 16A are both of a differential type. Further, in place of the adder 13a shown in FIG. 10, the resistance 31 with the positive-phase input signal VINP supplied to one end thereof and the other end thereof connected to a positive-phase input terminal of the differential non-inverting amplifier 15A and the resistance 34 with one end thereof connected to the output of the peak value holding circuit 12 and the other end connected to the positive-phase input terminal of the differential non-inverting amplifier 15A are included Further, the resistance 39a with an output of the differential amplifier 40A supplied to one end thereof and the other end thereof connected to a negative-phase terminal of the differential non-inverting amplifier 15A is included. Further, in place of the adder 14a shown in FIG. 10, the resistance 32 with the negative-phase input signal VINN supplied to one end thereof and the other end thereof connected to a positive-phase input terminal of the differential non-inverting amplifier 16A and the resistance 33 with one end connected to the output of the peak value holding circuit 11 and the other end connected to the positive-phase input terminal of the differential non-inverting amplifier 16A are included. Further, the resistance 39b with the output of the differential amplifier 40A supplied to one end thereof and the other end connected to a negative-phase input terminal of the differential non-inverting amplifier 16A is included. It is herein assumed that values of the resistance 31, the resistance 34, and the resistance 39a are equal, values of the resistance 32, the resistance 33, and the resistance 39b are equal, and a gain of the differential amplifier 40A is ½. Incidentally, referring to FIG. 17, the configuration except the adders 13a and 14a and the differential non-inverting amplifiers 15 and 16 in FIG. 10 is the same as in FIG. 10. As described above, in the signal amplifier circuit according to the seventh example as well, the adders are formed only by the simple resistive voltage division circuits, respectively.

Operations of the respective portions of the signal amplifier circuit according to the seventh example are the same as those in the fifth example, and operation waveforms of the respective portions are shown in FIGS. 12, 13, 14 and 15, as in the fifth example. The reason why the problems of the known art are solved is the same as in the fifth example.

Eighth Example

Figure 18:
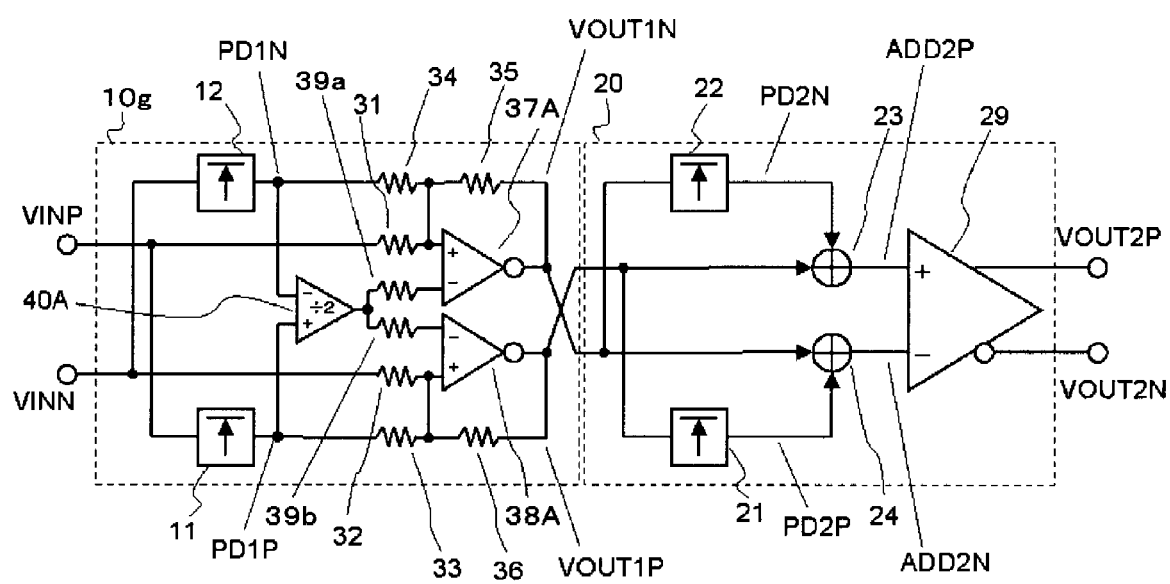
FIG. 18 is a block diagram showing a configuration of a signal amplifier circuit according to an eighth example of the present invention.

FIG. 18 is a block diagram showing a configuration of a signal amplifier circuit according to an eighth example of the present invention. Referring to an amplifying unit 10g in FIG. 18, in place of the differential non-inverting amplifier 15A in FIG. 17, a transimpedance amplifier is used. The transimpedance amplifier is formed of a differential inverting amplifier 37A that outputs the negative-phase output signal VOUT1N of the amplifying unit 10g and the resistance 35 that connects a positive-phase input of the differential inverting amplifier 37A and an output of the differential inverting amplifier 37A. In place of the differential non-inverting amplifier 16A in FIG. 17, a transimpedance amplifier is used. The transimpedance amplifier is formed of a differential inverting amplifier 38A that outputs the positive-phase output signal VOUT1P of the amplifying unit 10g and the resistance 35 that connects a positive-phase input of the differential inverting amplifier 38A and an output of the differential inverting amplifier 38A. The configuration except these transimpedance amplifiers is the same as in the seventh example.

Operations of the respective portions of the signal amplifier circuit according to the eighth example are the same as those in the fifth and sixth examples, and operation waveforms of the respective portions are shown in FIGS. 12, 13, 14 and 15, as in the fifth and sixth examples. The reason why the problems of the known art are solved is the same as in the fifth and sixth examples.

In the fifth, sixth, and seventh examples, respective impedances at input nodes of the non-inverting amplifiers 15 and 16 or at input nodes of the differential non-inverting amplifiers 15A and 16A increase. Accordingly, band lowering caused by parasitic capacitance tends to occur at each input node, and an upper limit of a practical operating speed is approximately 1 Gbps. On contrast therewith, in the eighth example, the transimpedance amplifier is connected to each input node, and the impedance at each input node is therefore kept to be low, as in the third example. Accordingly, the bandpass reduction caused by the parasitic capacitance at each input node is reduced, and implementation of a high-speed operation that greatly exceeds 2 Gbps is facilitated.

Ninth Example

Figure 19:
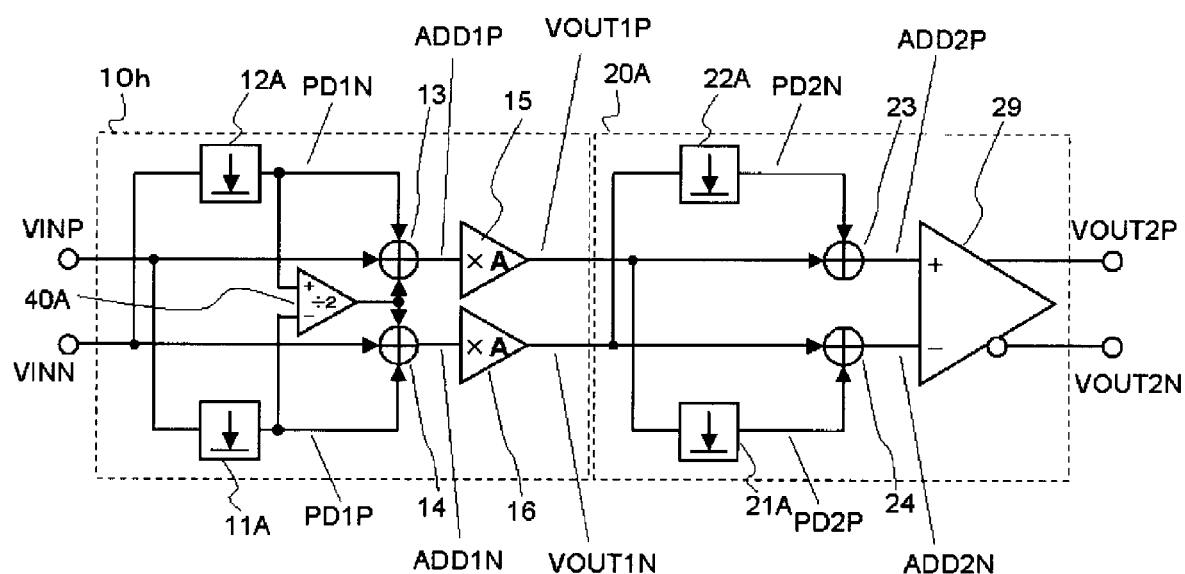
FIG. 19 is a block diagram showing a configuration of a signal amplifier circuit according to a ninth example of the present invention.

FIG. 19 is a block diagram showing a configuration of a signal amplifier circuit according to a ninth example of the present invention. Referring to FIG. 19, in place of the peak value holding circuits 11 and 12 in the amplifying unit 10d in FIG. 10, bottom value holding circuits 11A and 12A in an amplifying unit 10h are used, respectively. In place of the peak value holding circuits 21 and 22 in the amplifying unit 20 in FIG. 10, bottom value holding circuits 21A and 22A in an amplifying unit 20A are used, respectively. The configuration except for use of the bottom value holding circuits in place of the peak value holding circuits is the same as in the fifth example.

Figure 20:
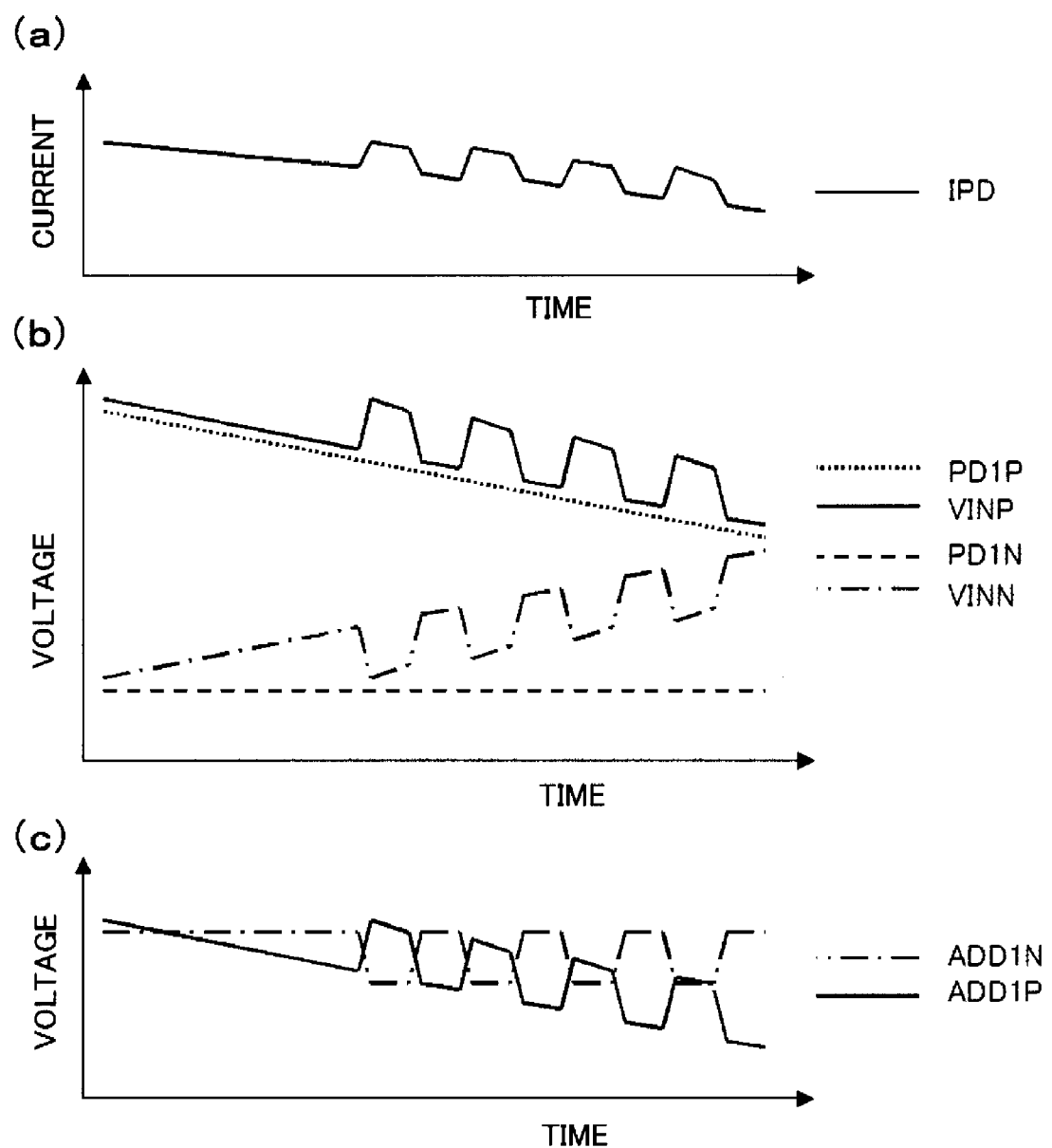
FIG. 20 is a first diagram showing operation waveforms of respective portions of the signal amplifier circuit according to the ninth example of the present invention.
Figure 21:
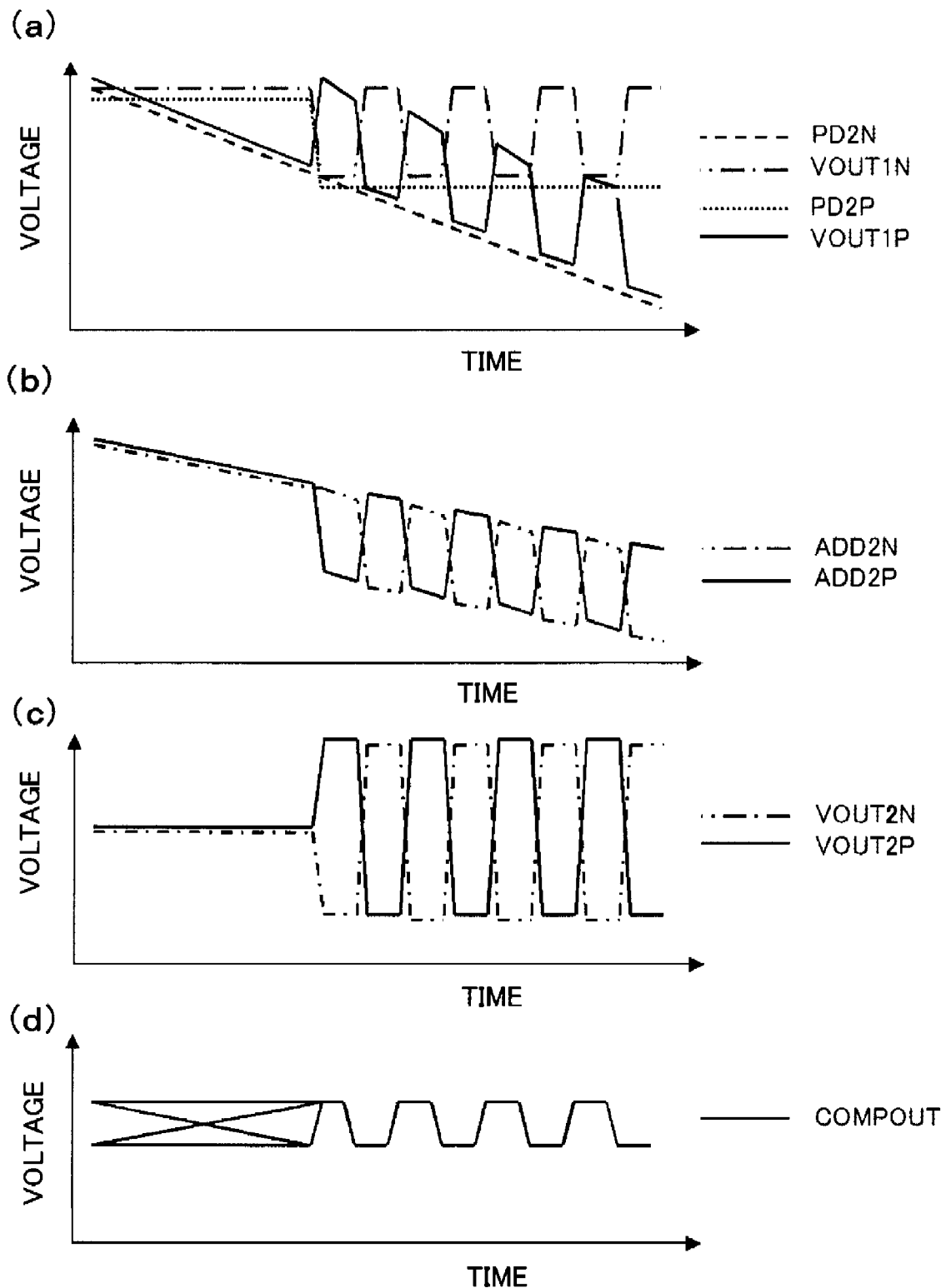
FIG. 21 is a second diagram showing operation waveforms of respective portions of the signal amplifier circuit according to the ninth example of the present invention.
Figure 22:
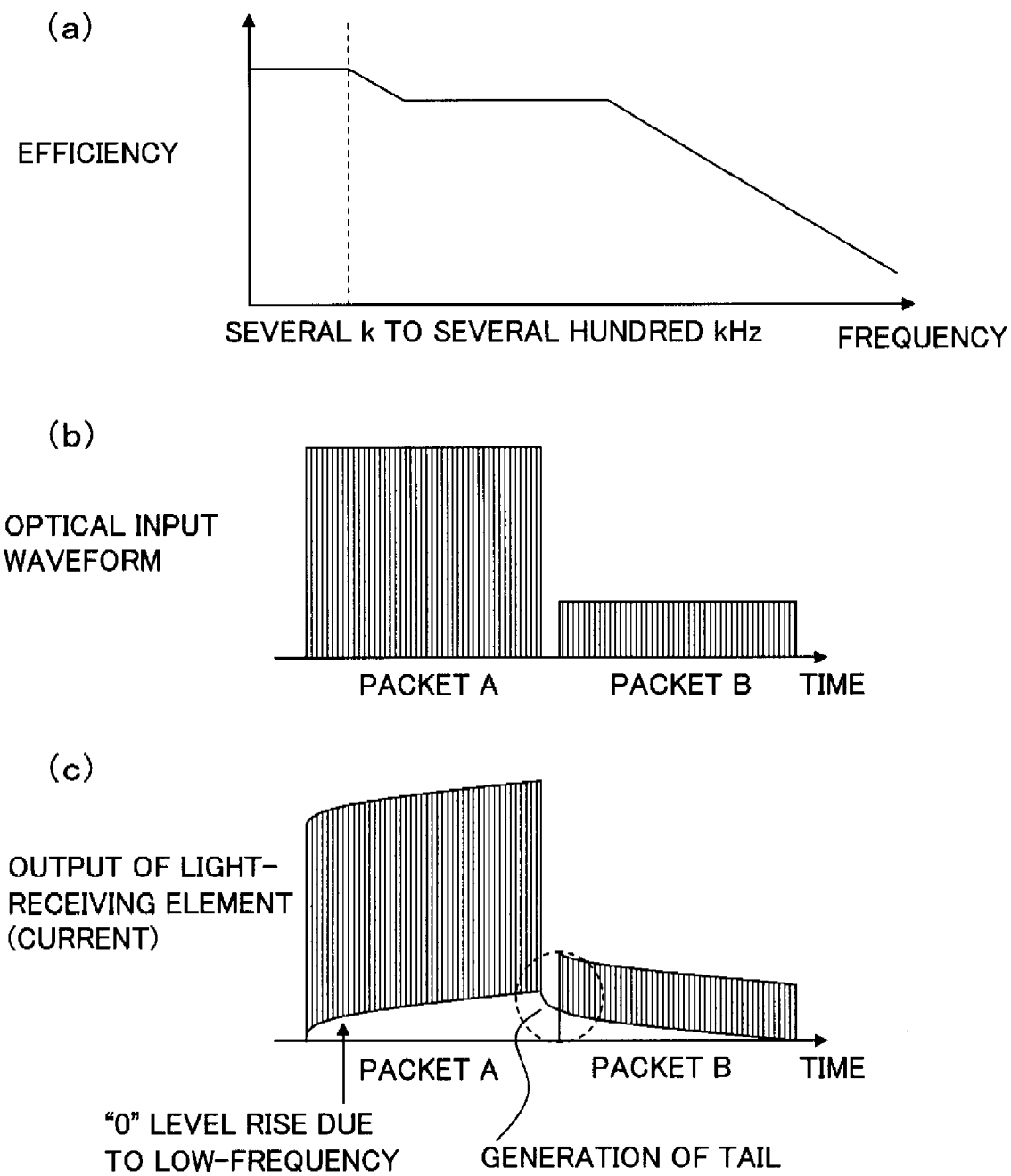
FIG. 22 includes diagrams showing characteristics of a light emitting element as a general reference case.
Figure 23:
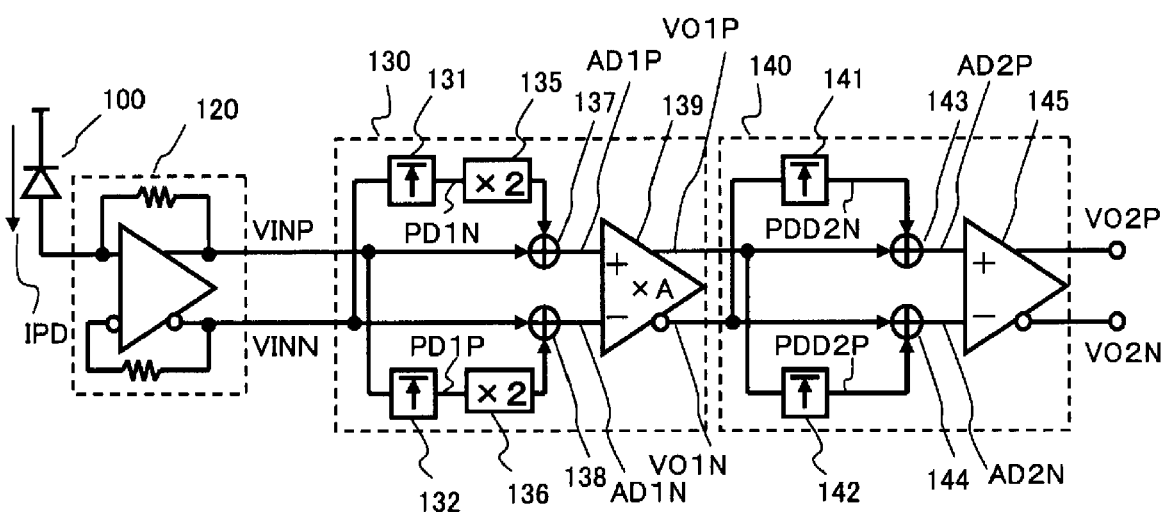
FIG. 23 is a block diagram showing a configuration of a conventional optical receiver.

FIGS. 20 and 21 are diagrams showing operation waveforms of respective portions in FIG. 19 when the photodetector 1 outputs the current signal IPD with a tail and the amplitude of the optical signal current to be received is smaller than that of the tail. Since the bottom value holding circuits are used in place of the peak value holding circuits, envelopes of the signals in the respective portions that monotonously increased in FIG. 13 monotonously decrease in FIG. 21. The bottom value detecting circuits capture the envelopes that will monotonously decrease, thereby performing the same, highly accurate unipolar to bipolar signal conversion as in the fifth example. When the high-frequency signal amplitude of each of the positive-phase input signal VINP and the negative-phase input signal VINN is sufficiently larger than the amplitude of the tail, the amplifying unit 10h substantially functions as the unipolar to bipolar signal converter circuit as well, which is the same as in the fifth example.

The above description was given in connection with the examples described above. The present invention, however, is not limited to the examples described above alone, and of course includes various variations and modifications that could be made by those skilled in the art within the scope of each claimed invention of this application.

INDUSTRIAL APPLICABILITY

The present invention can be applied to a station-side receiver or the like in an optical subscriber PON system.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A signal amplifier circuit comprising:
a first level holding circuit that receives a positive-phase input signal and outputs peak value of the positive-phase input signal;
a second level holding circuit that receives a negative-phase input signal and outputs a peak value of the negative-phase input signal;
a first adder that adds the positive-phase input signal and an output signal of said second level holding circuit;
a second adder that adds the negative-phase input signal and an output signal of said first level holding circuit;
a first amplifier that amplifies an output signal of said first adder; and
a second amplifier that amplifies an output signal of said second adder,
wherein the first amplifier and the second amplifier do not form a differential amplifier.

2. The signal amplifier circuit according to claim 1, further comprising a differential amplifier,
wherein said first adder adds a signal from the differential amplifier, obtained by multiplying a difference signal between output signals of said second level holding circuit and said first level holding circuit by a given gain, to the positive-phase input signal and the output signal of said second level holding circuit; and
said second adder adds a signal from the differential amplifier, obtained by multiplying said difference signal by the given gain, to the negative-phase input signal and the output signal of said first level holding circuit.

3. The signal amplifier circuit according to claim 2, wherein the given gain is not less than 0 and not more than 1.

4. The signal amplifier circuit according to claim 3, wherein the given gain is not less than 0.29 and not more than 0.71.

5. The signal amplifier circuit according to claim 4, wherein the given gain is about 0.5.

6. The signal amplifier circuit according to claim 1, wherein
said first adder is formed of a first resistance element pair of series-connected resistance elements, the positive-phase input signal being supplied to one end of said first resistance element pair, the output signal of said second level holding circuit being supplied to the other end of said first resistance element pair, and an intermediate node of said first resistance element pair being connected to an input of said first amplifier; and
said second adder is formed of a second resistance element pair of series-connected resistance elements, the negative-phase input signal being supplied to one end of said second resistance element pair, the output signal of said first level holding circuit being supplied to the other end of said second resistance element pair, and an intermediate node of said second resistance element pair being connected to an input of said second amplifier.

7. The signal amplifier circuit according to claim 6, wherein
two resistance values of said first resistance element pair are equal to each other; and
two resistance values of said second resistance element pair are equal to each other.

8. The signal amplifier circuit according to claim 2, comprising:
a first differential amplifier that outputs a difference signal between output signals of said first and second level holding circuits;
said first adder being formed of a first resistance element circuit comprising:
a first resistance element, the positive-phase input signal being supplied to one end of said first resistance element and the other end of said first resistance element being connected to an input of said first amplifier;
a second resistance element, the output of said second level holding circuit being supplied to one end of said second resistance element and the other end of said second resistance element being connected to the input of said first amplifier; and
a third resistance element, an output of said first differential amplifier being supplied to one end of said third resistance element and the other end of said third resistance element being connected to the input of said first amplifier;
said second adder being formed of a second resistance element circuit comprising:
a fourth resistance element, the negative-phase input signal being supplied to one end of said fourth resistance element and the other end of said fourth resistance element being connected to an input of said second amplifier;
a fifth resistance element, the output of said first level holding circuit being supplied to one end of said fifth resistance element and the other end of said fifth resistance element being connected to the input of said second amplifier; and
a sixth resistance element, the output of said first differential amplifier being supplied to one end of said sixth resistance element and the other end of said sixth resistance element being connected to the input of said second amplifier.

9. The signal amplifier circuit according to claim 2, comprising:
a first differential amplifier that outputs a difference signal between output signals of said first and second level holding circuits;
said first and second amplifiers being both of a differential type;
said first adder being formed of a first resistance element circuit comprising:
a first resistance element, the positive-phase input signal being supplied to one end of said first resistance element and the other end of said first resistance element being connected to a positive-phase input of said first amplifier;
a second resistance element, an output of said second level holding circuit being supplied to one end of said second resistance element and the other end of said second resistance element being connected to the positive input of said first amplifier; and a third resistance element, the output of said first differential amplifier being supplied to one end of said third resistance element and the other end of said third resistance element being connected to a negative-phase input of said first amplifier;

said second adder being formed of a second resistance element circuit comprising:

a fourth resistance element, the negative-phase input signal being supplied to one end of said fourth resistance element and the other end of said fourth resistance element being connected to an input of said second non-inverting amplifier;

a fifth resistance element, the output of said first level holding circuit being supplied to one end of said fifth resistance element and the other end of said fifth resistance element being connected to the input of said second non-inverting amplifier; and a sixth resistance element, the output of said first differential amplifier being supplied to one end of said sixth resistance element and the other end of said sixth resistance element being connected to a negative-phase input of said second amplifier.

10. The signal amplifier circuit according to claim 8, wherein resistance values of said first and second resistance elements are equal to each other;

a product of a resistance value of said third resistance element and a gain of said first differential amplifier assumes a predetermined value with respect to a resistance value of said first or second resistance element;

resistance values of said fourth and fifth resistance elements are equal to each other;

a product of a resistance value of said sixth resistance element and the gain of said first differential amplifier assumes the predetermined value with respect to a resistance value of said fourth or fifth resistance element; and the predetermined value is a value not less than 0 and not more than 1.

11. The signal amplifier circuit according to claim 10, wherein the predetermined value is not less than 0.29 and not more than 0.71.

12. The signal amplifier circuit according to claim 11, wherein the predetermined value is about 0.5.

13. The signal amplifier circuit according to claim 8, wherein a gain of said first differential amplifier is not less than 0 and not more than 1;

resistance values of said first, second, and third resistance elements are equal to one another; and resistance values of said fourth, fifth, and sixth resistance elements are equal to one another.

14. The signal amplifier circuit according to claim 13, wherein the gain of said first differential amplifier is not less than 0.29 and not more than 0.71.

15. The signal amplifier circuit according to claim 14, wherein the gain of said first differential amplifier is about 0.5.

16. The signal amplifier circuit according to claim 1, wherein gains of said first and second amplifiers are equal.

17. A signal amplifier circuit, comprising:

the signal amplifier circuit according to claim 1 as an initial (first) stage amplifying unit; and a second stage amplifying unit;

said second stage amplifying unit comprising:

a third level holding circuit that receives a positive-phase output signal output by said initial stage amplifying unit;

a fourth level holding circuit that receives a negative-phase output signal output by said initial stage amplifying unit;

a third adder that adds the positive-phase input signal and an output signal of said fourth level holding circuit;

a fourth adder that adds the negative-phase input signal and an output signal of said third level holding circuit; and a second differential amplifier that amplifies a difference signal between an output signal of said third adder and an output signal of said fourth adder.

18. The signal amplifier circuit according to claim 1, wherein said first amplifier is a non-inverting amplifier that outputs the positive-phase output signal; and said second amplifier is a non-inverting amplifier that outputs the negative-phase output signal.

19. The signal amplifier circuit according to claim 1, wherein said first amplifier is an inverting amplifier that outputs the negative-phase output signal; and said second amplifier is an inverting amplifier that outputs the positive-phase output signal.

20. The signal amplifier according to claim 19, wherein a resistance element is connected between input and output of said first inverting amplifier, and a resistance element is connected between input and output of said second inverting amplifier.

21. The signal amplifier circuit according to claim 17, wherein each of said first to fourth level holding circuits holds any one of peak and bottom values of the input signal.

22. An optical receiver comprising:

a photodetector;

a pre-amplifier that converts an output current of said photodetector to differential output signals; and the signal amplifier circuit according to claim 1;

said pre-amplifier outputting the differential output signals to the signal amplifier circuit as the positive-phase input signal and the negative-phase input signal.

23. The signal amplifier circuit according to claim 1, wherein the first amplifier and the second amplifier are not differential amplifiers.

24. The signal amplifier circuit according to claim 1, wherein the first amplifier and the second amplifier are non-inverting amplifiers.

25. A signal amplifier circuit, comprising:

a first stage amplifying unit; said first stage amplifying unit comprising:

a first level holding circuit that receives a positive-phase input signal;

a second level holding circuit that receives a negative-phase input signal;

a first adder that adds the positive-phase input signal and an output signal of said second level holding circuit;

a second adder that adds the negative-phase input signal and an output signal of said first level holding circuit;

a first amplifier that amplifies an output signal of said first adder; and a second amplifier that amplifies an output signal of said second adder;

a second stage amplifying unit; said second stage amplifying unit comprising:

a third level holding circuit that receives a positive-phase output signal output by said initial stage amplifying unit;

a fourth level holding circuit that receives a negative-phase output signal output by said initial stage amplifying unit;

a third adder that adds the positive-phase input signal, output by said initial stage amplifying unit, and an output signal of said fourth level holding circuit;

a fourth adder that adds the negative-phase input signal, output by said initial stage amplifying unit, and an output signal of said third level holding circuit; and a differential amplifier that amplifies a difference signal between an output signal of said third adder and an output signal of said fourth adder, wherein all of said first to fourth level holding circuits are either formed as peak-detecting circuits or as bottom-detecting circuits of the input signal, and wherein the first amplifier and the second amplifier are not part of the differential amplifier.

* * * * *